United States Patent [19]
Hart

[11] 3,846,755

[45] Nov. 5, 1974

[54] PATTERN RECOGNITION SYSTEM

[75] Inventor: William H. Hart, Arlington, Mass.

[73] Assignee: Electronic Reading Systems, Watertown, Mass.

[22] Filed: Aug. 6, 1973

[21] Appl. No.: 385,713

Related U.S. Application Data

[63] Continuation-in-part of Ser. No. 93,378, Nov. 27, 1970, which is a continuation-in-part of Ser. No. 885,044, Dec. 15, 1969, abandoned.

[52] U.S. Cl.................340/146.3 AC, 340/146.3 G, 340/146.3 H

[51] Int. Cl............................................. G06k 9/13

[58] Field of Search............340/146.3 H, 146.3 R, 340/146.3 AG, 146.3 G, 347 AD; 356/71; 235/183

[56] References Cited

UNITED STATES PATENTS

| | | | |
|---|---|---|---|
| 3,146,424 | 8/1964 | Peterson et al. | 340/347 AD |
| 3,159,815 | 12/1964 | Groce | 340/146.3 AG |
| 3,268,864 | 8/1966 | Kubo et al. | 340/146.3 AE |
| 3,292,148 | 12/1966 | Giuliano et al. | 340/146.3 G |
| 3,394,347 | 7/1968 | Crane | 356/71 |

*Primary Examiner*—Gareth D. Shaw
*Assistant Examiner*—Leo H. Boudreau
*Attorney, Agent, or Firm*—Cesari and McKenna

[57] ABSTRACT

A pattern recognition system scans an unknown pattern to detect moments of successive slices or portions of the pattern. Certain of these moment signals are selected in various sections of the pattern obtain comparison parameters based on characteristics of the sections. These comparison parameters and parameters for reference patterns are compared to identify the unknown pattern.

23 Claims, 59 Drawing Figures

| CHARACTERS | DIFFERENTIATING OPTICAL CHARACTERISTIC | CORRESPONDING PHYSICAL CHARACTERISTIC |
|---|---|---|
| V, v | SIZE | MASS |
| r q | SIZE AND BALANCE | MASS AND BALANCE |
| 9, 6 | BALANCE | BALANCE |
| 1, 7 | SLENDERNESS | DISPERSION, BALANCE |
| I, Φ | CENTRALNESS OF AREA DISTRIBUTION | DISPERSION RELATIVE TO CENTER OF GRAVITY |
| I, Φ | DENSITY | DISPERSION |

FIG. 1

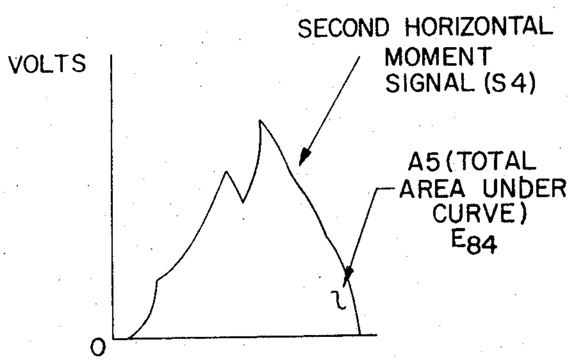
FIG. 2F
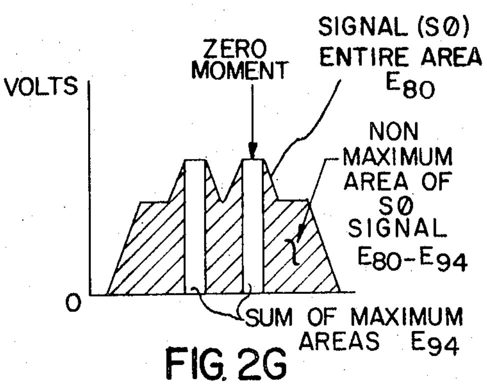
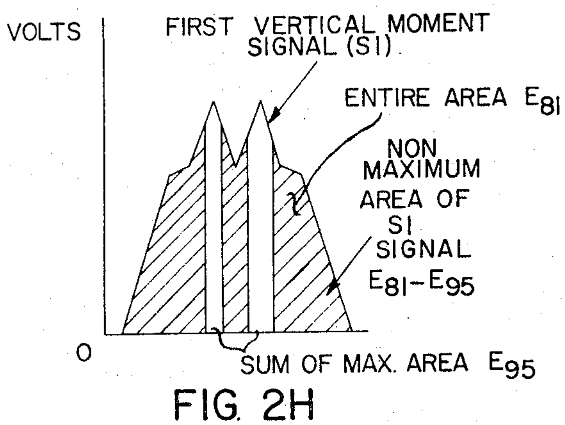
FIG. 2H
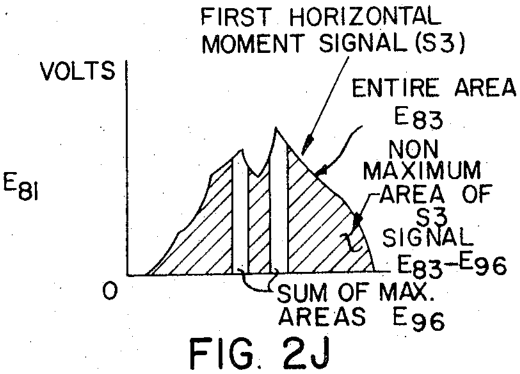
FIG. 2J
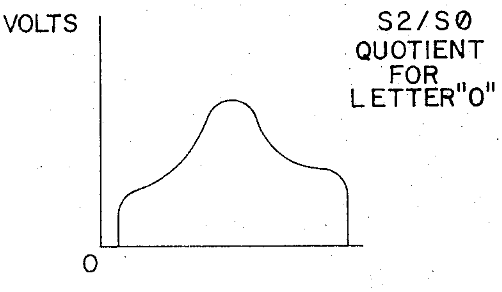
FIG. 2K

GLOBAL CHARACTERISTICS

COMPONENT CHARACTERISTICS

LETTER N AND DERIVATIVE OF LOCUS OF CENTROID

DERIVATIVE OF LOCUS OF RADIUS OF GYRATION ABOUT AXIS B–B OF A VERTICAL PORTION IN LETTER "A"

LETTER "K" AND DERIVATIVE OF LOCUS OF RADIUS OF GYRATION ABOUT AXIS B-B

LETTER "O" AND DERIVATIVE OF RADIUS OF GYRATION OF VERTICAL SECTION

DEVELOPMENT CHARACTERISTICS

LETTER "M" AND DERIVATIVE

DERIVATIVE VALUES FOR LOCUS OF CENTROID OF VERTICAL SECTIONS IN LETTER "A"

GLOBAL CHARACTERISTICS

| CHARACTERISTIC | | SYMBOL | DEFINITION |
|---|---|---|---|
| NO. | NAME | | |
| 1 | MAXIMUM SOLID HEIGHT | $h_{s\ max}$ | MAXIMUM OF SOLID OR COMPRESSED HEIGHT OF THE CHARACTER. THE MAGNITUDE EXCLUDES ANY NON-CHARACTER (FIELD) HEIGHT WHICH MIGHT BE INCLUDED BY A VERTICAL SECTION. (FIGS. 3A, 3C) |
| 2 | MAXIMUM WIDTH | $w_{max}$ | TOTAL WIDTH OF CHARACTER (FIG. 3A) |
| 3 | VERTICAL CENTROID | $h_c$ | DISTANCE OF THE CENTROID (FIG. 3A) FROM THE BOTTOM HORIZONTAL AXIS (B-B)(FIG. 3B) OF A CHARACTER |
| 4 | HORIZONTAL CENTROID | $w_c$ | DISTANCE OF THE CENTROID FROM THE LEFT-HAND VERTICAL AXIS (C-C IN FIG. 3A) OF A CHARACTER. |
| 5 | VERTICAL RADIUS OF GYRATION | $h_g$ | RADIUS OF GYRATION ABOUT THE CENTER OF GRAVITY (FIG.3B) |
| 6 | HORIZONTAL RADIUS OF GYRATION | $w_g$ | RADIUS OF GYRATION ABOUT THE LEFTHAND AXIS (C-C)(FIG. 3B) |

FIG. 4

COMPONENT CHARACTERISTICS

| CHARACTERISTIC | | | |
|---|---|---|---|
| NO. | NAME | SYMBOL | DEFINITION |
| 1 | MAXIMUM SECTION VERTICAL CENTROID | $h_{c\ max}$ | DISTANCE FROM THE BOTTOM AXIS(B-B) TO THE CENTROID OF THE HIGHEST MAXIMUM SECTION. (FIG. 3D) |
| 2 | MINIMUM SECTION VERTICAL CENTROID | $h_{c\ min}$ | DISTANCE FROM THE BOTTOM AXIS (B-B) TO THE CENTROID OF THE MINIMUM SECTION (FIG. 3E) |
| 3 | MINIMUM SECTION VERTICAL RADIUS OF GYRATION | $h_{g\ min}$ | RADIUS OF GYRATION OF MINIMUM SECTION ABOUT CENTER OF GRAVITY OF THAT SECTION. |
| 4 | VERTICAL CENTROID OF NON-MAXIMUM SECTION | $h_{c\ non-max}$ | DISTANCE FROM THE BOTTOM AXIS TO THE CENTROID OF THAT AREA OF A CHARACTER WHICH REMAINS AFTER ALL MAXIMUM SOLID HEIGHT SECTIONS ARE EXCLUDED. |
| 5 | HORIZONTAL CENTROID OF NON-MAXIMUM SECTION | $w_{c\ non-max}$ | DISTANCE FROM THE LEFT HAND AXIS OF A CHARACTER (C-C) TO THE CENTROID OF THE NON-MAXIMUM SECTION AS DEFINED BY $h_c$ NON-MAX. (FIG. 3G) |

FIG. 5

SPECIAL CASE COMPONENT CHARACTERISTICS

| CHARACTERISTIC | | SYMBOL | DEFINITION |
|---|---|---|---|
| NO. | NAME | | |
| 6 | MIDPOINT VERTICAL RADIUS OF GYRATION | $h_{g\ mpt}$ | RADIUS OF GYRATION OF A PORTION LOCATED AT THE CENTER OF THE CHARACTER ABOUT THE CENTER OF GRAVITY OF THAT PORTION (FIGURE 3U). |
| 7 | AREA OF LEFT HAND SECTION | $h_{s\ tls}$ | AREA OF IMAGE LOCATED BETWEEN ITS LEFT HAND EDGE AND A VERTICAL AXIS PASSING THROUGH A POINT ONE THIRD OF THE WAY ACROSS THE WIDTH OF THE CHARACTER (FIGURE 3W) |
| 8 | MAXIMUM AREA OF LEFT HAND SECTION | $h_{s\ max\ tls}$ | AREA OF PORTIONS EXHIBITING MAXIMUM SOLID HEIGHT IN THE LEFT HAND SECTION OF A CHARACTER (AS DEFINED ABOVE). THIS MAXIMUM SOLID HEIGHT IS THE MAXIMUM SOLID HEIGHT IN THE LEFT HAND SECTION (FIGURE 3X) |
| 9 | VERTICAL FIRST MOMENT FOR PORTIONS CONTAINING TWO LINES IN SECOND HALF OF CHARACTER | $\leq S_{l(ln=2)}$ | TOTAL FIRST ORDER MOMENT ABOUT THE BOTTOM AXIS (B-B) OF THESE PORTIONS IN THE RIGHT SECTION OF THE CHARACTER IN WHICH THE PORTIONS EVIDENCE EXACTLY TWO LINES (FIGURE 3Y) |
| 10 | VERTICAL FIRST MOMENT FOR PORTIONS CONTAINING TWO OR MORE LINES IN SECOND HALF OF CHARACTER | $\leq S_{l(ln\geq 2)}$ | TOTAL FIRST ORDER MOMENT ABOUT THE BOTTOM AXIS (B-B) OF THESE PORTIONS IN THE SECOND HALF OF THE CHARACTER IN WHICH THE PORTIONS EVIDENCE TWO OR MORE LINES. (FIGURE 3Z). |

FIG. 6

MINIMUM SECTION GYRATION HEIGHT

| GEOMETRIC CLASS OF CHARACTER | EXAMPLES | TYPICAL ELITE FONT VALUES | TYPICAL BLOCK FONT VALUES |
|---|---|---|---|
| 1 SLANT MEMBERS ONLY | V, W | .29 | .29 |
| 2 INTERSECTING SLANT MEMBER | X | .15 | .15 |
| 3 SINGLE MEMBER BETWEEN VERTICAL MEMBERS | H, N | .06 | .09 |
| 4 SINGLE BAY CLOSED BY VERTICAL LINE | D | .45 | .43 |
| 5 DOUBLE BAY CLOSED BY VERTICAL LINE | B | .37 | .35 |

FIG. 7

FUNDAMENTAL COMPARISON PARAMETER FORMULAE AND SCALE VALUE RANGES

| COMPARISON PARAMETERS NO. | DESCRIPTION | FORMULA | SCALE VALUE RANGE |
|---|---|---|---|
| 1 | hc/hc max | $(E81 \cdot E85)/(E80 \cdot E86)$ | $-3 \rightarrow +3$ |
| 2 | Wc/Wmax | $E_{83}/(E_{80} \cdot E_{74})$ | $-3 \rightarrow +3$ |
| 3 | hg/hs max | $[(E82/E80)-(E81/E80)^2]^{1/2}/E85$ | $-3 \rightarrow +3$ |
| 4 | Wg/Wmax | $[E84/E80]^{1/2}/E74$ | $-3 \rightarrow +3$ |
| 5 | hc min/hc max | $(E85 \cdot E91)/(E86 \cdot E90)$ | $-3 \rightarrow +3$ |
| 6 | hc non max/hc max | $[(E_{81}-E_{95}) \cdot E_{85}]/[(E_{80}-E_{94}) \cdot E_{86}]$ | $-3 \rightarrow +3$ |
| 7 | Wc non max/Wmax | $[(E83-E96)/(E80-E94)]/E74$ | $-3 \rightarrow +3$ |
| 8 | hg min/hs max | $[E_{92}/E_{90}-(E_{91}/E_{90})^2]^{1/2}/E_{85}$ | $0 \rightarrow 9$ |
| 9 | Wmax | $E74$ | $0 \rightarrow 9$ |
| 10 | hg-mpt/ $h_s$ max | $[E_{306}/E_{304}-(E_{305}/E_{304})^2]^{1/2}/E_{85}$ | $-3 \rightarrow +3$ |
| 11 | $h_s$ max tls/ $h_s$ tls | $E_{308}/E_{307}$ | $0 \rightarrow 1$ |
| 12 | $\leq SI_{(In=2)}/\leq SI_{(In\geq 2)}$ | $E_{310}/E_{311}$ | $0 \rightarrow 1$ |
| 13 | SLOPE POSITIVE | $E_{172}$ | $0 \rightarrow 9$ |
| 14 | SLOPE NEGATIVE | $E_{178}$ | $0 \rightarrow 9$ |
| 15 | SLOPE SEQUENCE | $E_{174}$ | 0 OR 1 |
| 16 | DOUBLE SLOPE RIGHT | $E_{192}$ | $0 \rightarrow 9$ |
| 17 | DOUBLE SLOPE LEFT | $E_{194}$ | $0 \rightarrow 9$ |
| 18 | DOUBLE SLOPE SEQUENCE | $E_{196}$ | 0 OR 1 |
| 19 | NO. OF MAXIMUMS | $E_{200}$ | $0 \rightarrow 9$ |
| 20 | SINGLE OR NO MAXIMUM | $E_{202}$ | 0 OR 1 |

CORRESPOND TO EARLIER ORDER

FIG. 12

INTEGRATE AND HOLD CIRCUIT

PEAK VOLTAGE DETECTOR

MINIMUM VOLTAGE DETECTORS

PATTERN RECOGNITION SYSTEM

CROSS-REFERENCES TO RELATED PATENT APPLICATIONS

This is a continuation-in-part of application Ser. No. 93,378, filed Nov. 27, 1970, now abandoned, which is a continuation-in-part of Ser. No. 885,044 filed Dec. 15, 1969 (now abandoned).

BACKGROUND OF THE INVENTION

1. Field of the Invention

This invention relates to a method and system for pattern recognition whereby traditional human-recognizable information forms, such as alphanumeric characters and other symbols, are converted into machine-recognizable forms.

2. Description of the Prior Art

The increased use of electronic data processing equipment has created a significant commercial need for machines capable of translating alphanumeric characters into machine-readable forms. Data processing equipment manipulates large quantities of data in short periods of time and thus requires rapid introduction of new data. Although the data input medium often comprises a punched tape, punched cards, magnetic tape or the like, the original data source is often a written (i.e., typewritten or printed) document. For example, the data processing systems are often used to process the content of customer credit slips, payroll vouchers, income tax returns, and various internal company records.

The most widely used method of translating written information into machine-readable form involves a human operator who reads the written data and manually punches it onto punched cards or paper tape, or enters it directly onto magnetic tape or other machine compatible medium. This arrangement is inordinately slow for high volume applications, it is expensive and it is excessively prone to errors due to human fallibility.

Therefore, a variety of arrangements have been developed or are under development to accomplish character recognition by machine. Basically, each of these machines senses the values of a set of parameters of an unknown character and compares this set with stored sets corresponding to prototype characters. The unknown character is identified by determining which of the stored sets of parameter values most closely corresponds with its own values. In general these systems operate in accordance with one of the following methods.

The first if these is an optical pattern superposition and matching arrangement. A set of photographic optical masks are used with each mask representing a given prototype character. The unknown character is projected onto the masks to determine which mask best matches or "fits" it.

In the second system, the character image is transferred into a logical matrix representing the field of the character. Detectors sense the presence or absence of character portions in various segments or cells of the matrix, and the set of detector outputs are compared with the sets one would obtain with the various prototype characters.

A more recent system segmentally scans the whole character and determines the number of lines present, the number of line intersections and the nature and orientation of the various intersections. In one such machine more than ninety different features are detected and correlation is then employed to "fit" the unknown character to one of the prototypes.

A still more elaborate system also senses the unknown character in a logical matrix. Complex computer programs are then used to detect particular curved lines, slant lines, and straight lines. The number and orientations of the various lines identify the character.

Another arrangement involving the use of a logical matrix includes a computer which receives the various outputs of the matrix, and generates, tests and selects an effective family of algorithms which will discriminate among the different characters. This system has the advantage of being self-taught but it requires a comparative excess of computational time and, on occasion, long "learning" times.

The above character recognition systems are characterized by serious shortcomings. For example, the masking technique has serious technical problems associated primarily with the speed and accuracy of positioning the unknown character with respect to the various masks. The logical matrix systems which identify the position of character segments, or the classification of these segments, require undue computational hardware and excessive decision making time unless they are restricted to a limited number of characters and a few fonts.

An alternative to the various matrix approaches is a mode of identification based on the use of "mathematically invariant" properties of character patterns. Specifically, it has been suggested that a character recognition system might generate the zero and various higher order moments of the entire character about various axes, with recognition being based on the values of the various moments. Conceptually this approach has much to offer. However, it has failed to gain commercial adoption. There may be a number of reasons for this. An important one is the fact that a relatively large number of moments must be computed and these include higher order moments which are more sensitive to noise both in the background and aberrations in the character itself. This renders the system comparatively error prone.

Therefore, it is an object of this invention to provide a versatile, simple and accurate method and system for recognizing printed characters and other patterns for translation into a machine-usable format.

Another object of the invention is to provide a character recognition system and method whose outputs are to a substantial degree unaffected by variations of size and line thickness of the characters.

A further object of the invention is to provide a character recognition method and system which exhibit a substantial independence of character font or style.

A still further object of the invention is to provide a character recognition method and system characterized by high speed and accuracy, yet one which can be implemented at relatively reduced costs.

SUMMARY

In accordance with my invention, a pattern recognition system measures different moments of an unknown pattern. The system converts these moments into a plurality of comparison parameters which are compared with corresponding parameters for reference patterns to identify the unknown pattern. At least one comparison parameter is based upon a ratio of moments which indicate a predetermined characteristic in a section of the unknown pattern.

This invention is pointed out with particularity in the appended claims. A more thorough understanding of the above and further objects and advantages of this invention may be attained by referring to the following description taken in conjunction with the accompanying drawings.

BRIEF DESCRIPTION OF THE DRAWINGS

FIG. 1 is a table of physical and optical characteristics for some representative characters;

FIGS. 2A through 2H, 2J through 2N, 2P, 2R and 2S, graphically illustrate the manner in which various signals are developed to ascertain certain of the symbol-identifying characteristics;

FIG. 4 is a table of global characteristics and their definitions;

FIG. 5 is a table of component characteristics and their definitions;

FIG. 6 is a table of special-case component characteristics and their definitions;

FIG. 7 is a table of values of a comparison parameter for some representative characters;

FIG. 12 is a table showing how the comparison parameters of symbols are derived from the signals developed by the circuit of FIGS. 11A through 11D;

DESCRIPTION OF AN ILLUSTRATIVE EMBODIMENT

GENERAL DESCRIPTION

Figure 2A:
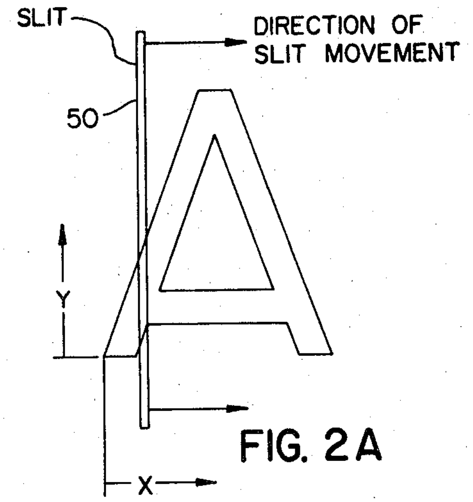

My recognition system employs various moments of patterns, including alphanumeric characters. However, unlike the prior moment-computing systems, it goes beyond the use of moments of the entire pattern. Rather, it also senses moments of different portions or slices of the pattern and uses these partial moments in determining the values of certain parameters that aid in distinguishing the patterns from each other. Specifically, selected moments indicative of certain characteristics are sensed over sections of the pattern comprising one or more portions and the values of these moments are then combined to obtain certain comparison parameters. This minimizes the number of moments that must be determined and in particular it makes using third and higher order moments unnecessary. At the same time it permits the use of moment-derived parameters that are, in character recognition, to a substantial degree font-invariant. That is, the system can readily recognize characters of a number of different type styles or fonts without an undue degree of circuit complexity.

The invention is largely based on the realization that printed characters or other patterns are not simply optical patterns which must be identified by statistical or quasi-statistical observations such as the presence of a part of a pattern in a particular matrix cell or quadrant, the number of vertical-horizontal intersections, or the number and lengths of straight lines, etc. Rather, alphanumeric characters are a class of patterns which can be identified by considering them as physical objects. It is thus possible to define various pseudo-physical attributes that will differentiate one character from another independently of substantial variation in font or style.

For example, just three familiar physical characteristics can be used as a basis for effective character differentiation. These characteristics are: (1) relative size or mass, (2) balance and (3) dispersion. Relative size relates to the height or width or area of one character or character section to the corresponding characteristics of another character or character section.

Balance relates to the location of the center of gravity. Most commonly, the center of gravity of the whole pattern is compared to the mid-point of a major dimension (height or width) to indicate balance, left-handedness, top heaviness and bottom heaviness. In connection with the present invention, balance is also defined to include comparisons of the location of the center of gravity of one section of the character to the location in another section.

Dispersion concerns the degree to which the "mass" of the character is concentrated near a central point or dispersed from that point. This attribute is ascertained from the radius of gyration, which may be measured in relation to the centroid of the character or a vertical or horizontal axis along one edge of the character. The relative dispersion of the entire character is used and, as in the case of balance, the dispersion of one section of the character may be compared with that of another section.

FIG. 1 demonstrates how these characteristics can be used to differentiate various characters from each other. Several pairs of characters are listed and each pair has one or more differentiating optical characteristics and the corresponding physical characteristics.

It will be quite apparent that a determination of the three characteristics of characters as a whole, as indicated in FIG. 1, will not serve to unequivocally distinguish each character from every other character, especially if a number of fonts are involved. Accordingly, the system provides further character differentiation (and font independence) by determining these and related characteristics for different aspects of a character.

I. Aspects of a Character

Before going into these aspects, it will be helpful to understand the manner in which the system scans a character. As shown diagrammatically in FIG. 2A, the character is viewed through a vertical slit 50 that moves across the character. Thus, at any given instant the system views a narrow vertical portion or slice of the character and this is accomplished by a set of sensors.

Ordinarily, one of these sensors will have a response that is constant from the bottom to the top of the slit 50. The output of this sensor therefore indicates the mass or compressed height of the portion under view. The response of the other sensors vary in the vertical direction and the outputs of these sensors indicate various moments of the portion. The sensor outputs can be integrated to provide corresponding parameters for the entire character and the various signals can be manipulated in other ways to provide measures of various other parameters.

Returning to the characteristic-determining aspects of a character, I prefer to use a set of aspects which may include: (A) global, (B) component, (C) special-case component, (D) development and (E) sequential aspects.

A. Global Aspects of a Character

The characteristics determined from the global aspect are those which relate to the character as a whole. Six such characteristics are shown and defined in FIG. 4 and illustrated in FIGS. 3A, 3B and 3C.

B. Component Aspects of a Character

The system makes use of five characteristics determined from the component aspect (i.e., the characteristics of sections of a character) which comprise one or more portions. These are defined in FIG. 5 and illustrated in FIGS. 3C through 3G. Since these are not familiar characteristics, their description will be helpful to the reader.

Figures 3A, 3B:
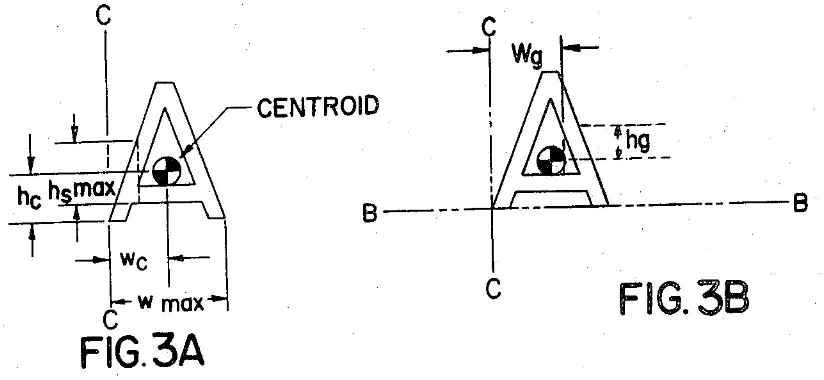
FIGS. 3A through 3H, 3J through 3N, 3P and 3R through 3Z are diagrams illustrating certain characteristics of alphanumeric symbols that can be used in identifying the symbols in accordance with the invention.
Figures 3C, 3D:
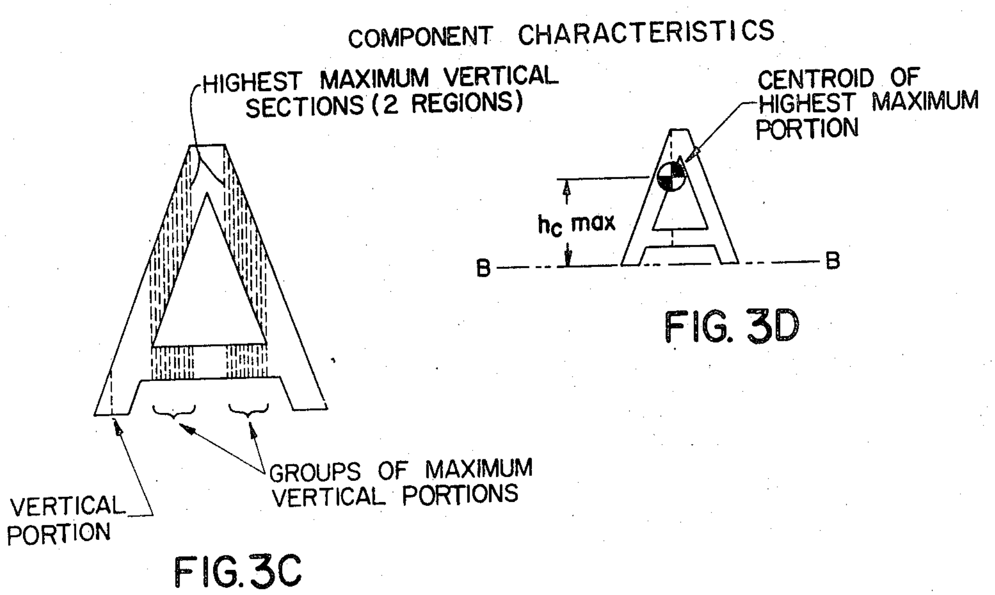

Component characteristic No. 1 is the maximum section vertical centroid ($h_{c\ max}$). The maximum section is one portion or slice wide. Generally, $h_{c\ max}$ is the distance from the bottom axis to the centroid in the portion having the highest centroid. The maximum section, which may comprise one or more portions, is that vertical section which exhibits the maximum solid height as defined in FIG. 4. A pattern may have more than one maximum section, as shown in FIG. 3C. A typical $h_{c\ max}$ is shown in FIG. 3D.

Figure 3E:
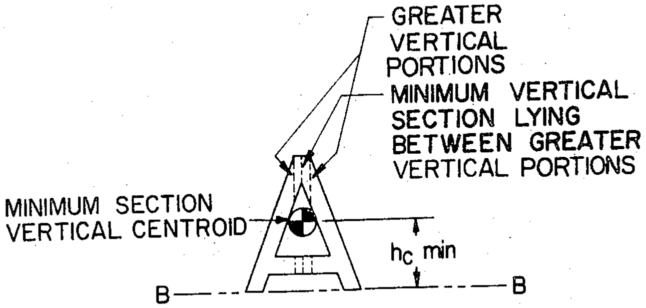

Component characteristic No. 2 is the minimum section vertical centroid ($h_{c\ min}$). Usually this is the distance from the bottom axis to the centroid of the vertical section (normally comprising only one portion) which displays a minimum solid height. A minimum section as so defined must lie between portions of greater solid height. If there is more than one minimum section, the lowermost centroid of a minimum section is used; that is, the centroid nearest the bottom of the character. FIG. 3E illustrates a typical minimum section vertical centroid.

Component characteristic No. 3 is the minimum section vertical radius of gyration ($h_{g\ min}$), which is the radius of gyration of the minimum section about a horizontal axis through the centroid of the minimum section.

As explained below, the parameters $h_{c\ max}$, $h_{c\ min}$ and $h_{g\ min}$, as measured by the circuits described herein, may aptly be termed "hybrid" characteristics.

Figure 3M:
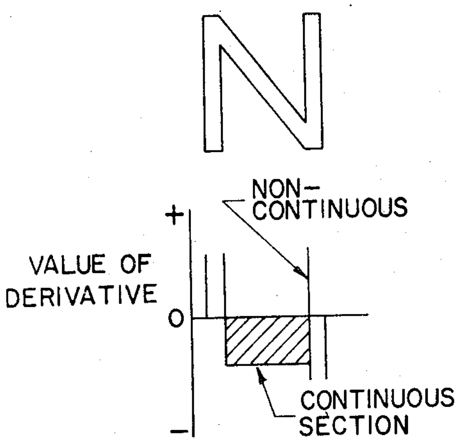
Figure 3N:
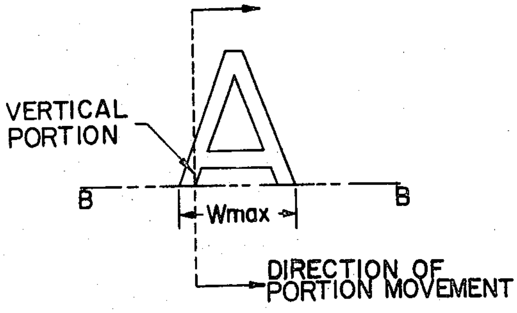
Figure 3R:
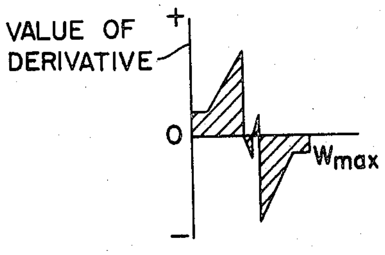
Figure 3P:
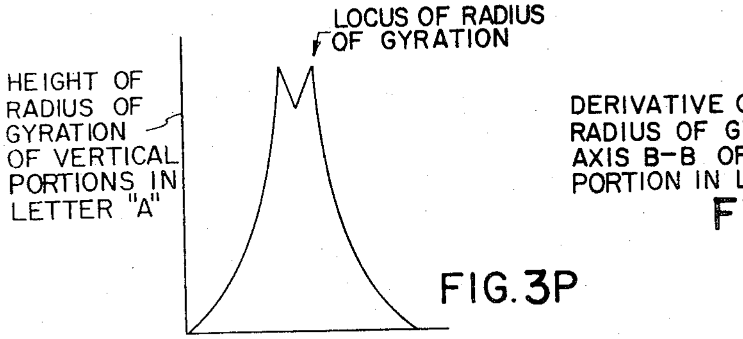
Figure 3T:
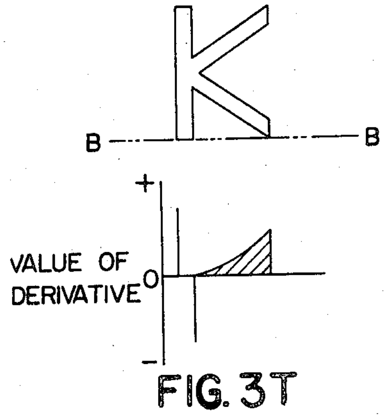
Figure 3S:
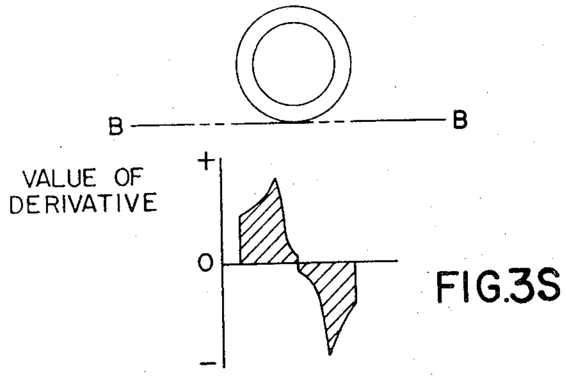
Figure 3F:
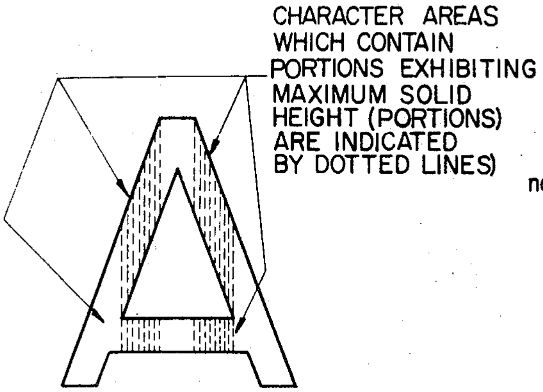
Figure 3G:
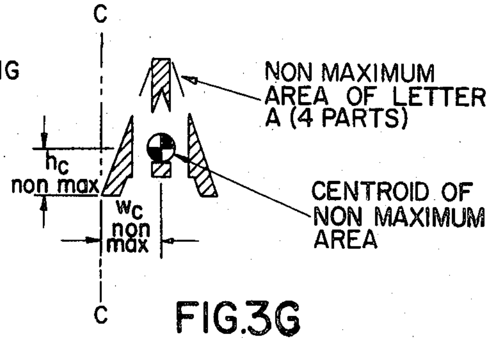

Component characteristics Nos. 4 and 5 are centroid distances for the non-maximum area of the character. The nonmaximum area is defined as that area of a character that remains after all the sections exhibiting maximum solid height (as defined in FIG. 4) have been removed, as illustrated in FIGS. 3F and 3G. One of these characteristics (No. 4) is the distance of the centroid of the non maximum section from the bottom axis ($h_{c\ non\text{-}max}$) and the other (No. 5) is the distance of the same centroid from the left hand axis of the character ($w_{c\ non\text{-}max}$).

C. Special-Case Component Aspects of a Character

When the width of the character is known beforehand or determined during scanning, as discussed later, the recognition system can predefine certain sections of an image. Five special-case component characteristics are defined in FIG. 6 and shown in FIGS. 3U through 3Z by way of example.

Figure 3H:
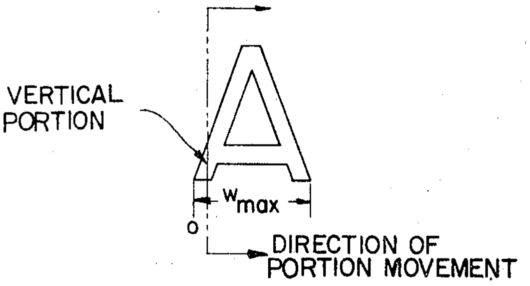
Figure 3J:
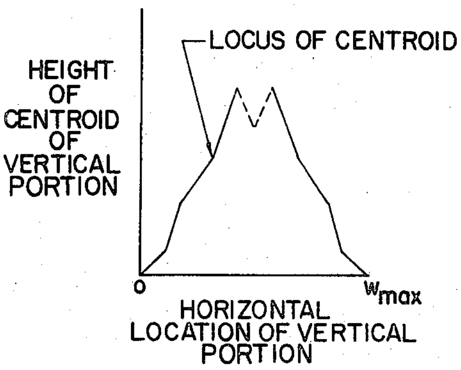
Figure 3L:
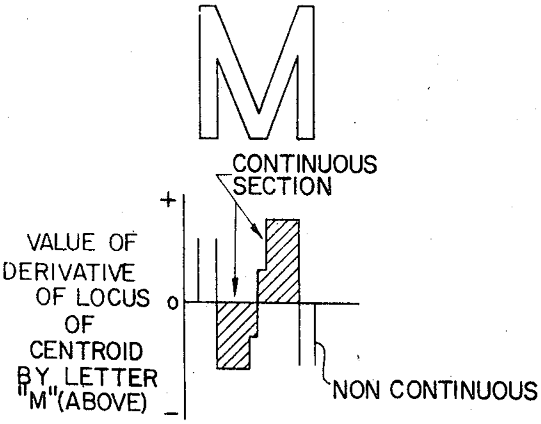
Figure 3K:
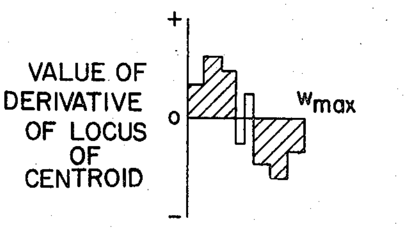
Figures 3U, 3V, 3W, 3X, 3Y, 3Z:
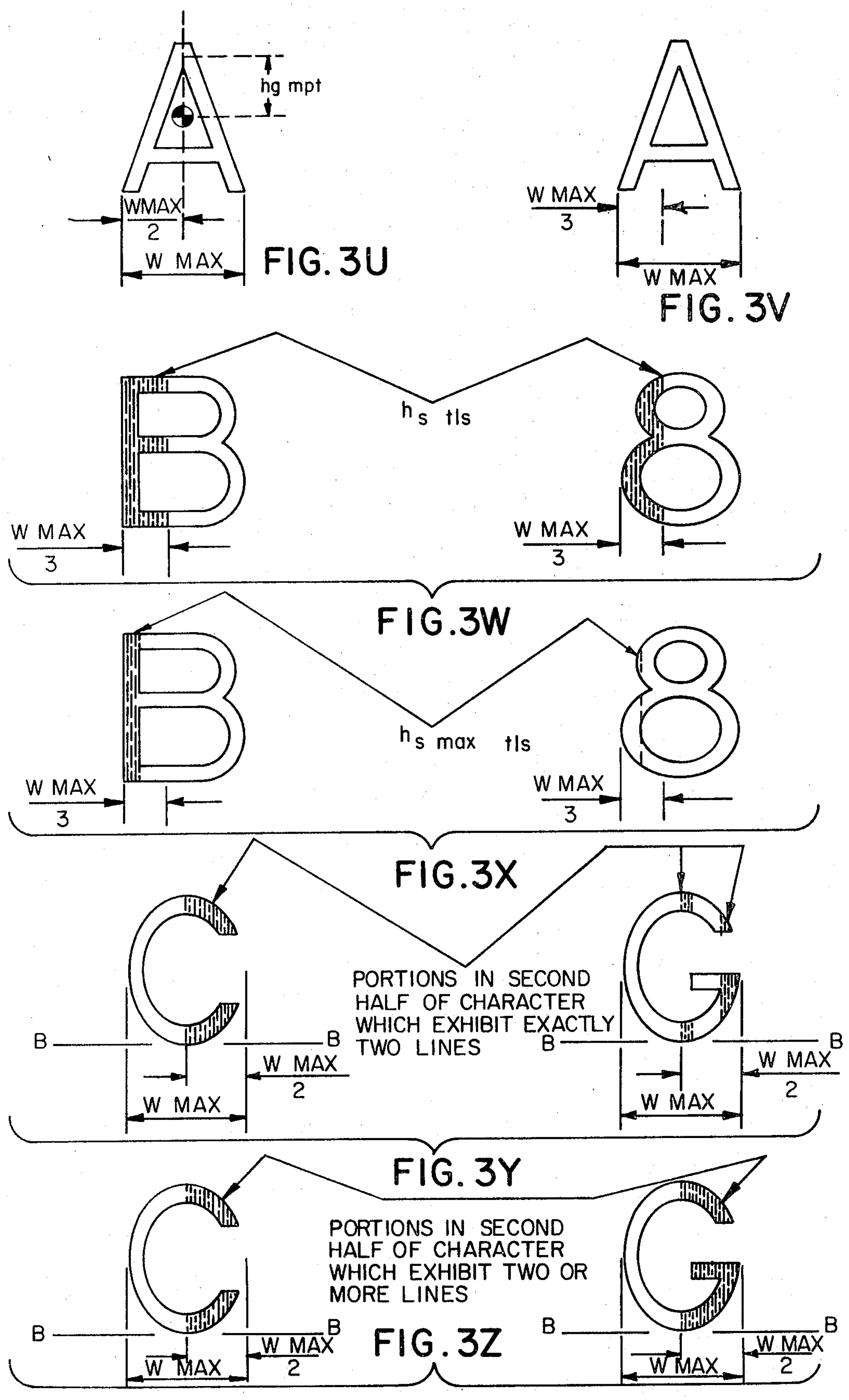

Special-case component characteristic No. 6 is midpoint vertical radius of gyration which is the radius of gyration of a section located at the horizontal midpoint of the character ($h_{g\ mpt}$) as shown in FIG. 3U.

Special-case component characteristics Nos. 7 and 8 in combination indicate the "squareness" or the "curviness" of a left section of a character. Specifically, characteristic No. 7 is shown to be the area of the image in the left third section in FIGS. 3V and 3W. Characteristic No. 7 is denoted as $h_{s-tls}$.

Special-case component characteristic No. 8 is the total area of all maximum areas within the left section. It is the sum of the areas of all portions which have a maximum (or near maximum) solid height during the scanning of the left hand section. If characters are scanned from left to right, a portion with a maximum solid height referred to above is the maximum for the left section. Portions of greater solid height may exist in other parts of the whole character. This property is denoted as $h_{s-max-tls}$. For the letters B and 8, FIG. 3X shows portions of sections included in this characteristic.

Special-case component characteristic No. 9 is the sum of the first-order moments about a horizontal axis for all the sections in the right section of the character which evidence the presence of two, and only two, lines. This characteristic is denoted as $\Sigma S1(1n = 2)$. For comparison, the sections of the characters C and G which are included in $\Sigma S1\ (1n = 2)$ are shown in FIG. 3Y.

Characteristic No. 10 is similar to the No. 9 except that the qualifying feature for a portion is the presence of two or more black lines. Thus, this characteristic is the sum of the vertical, first-order moments for all portions in the second half of a character which evidence two or more lines. This property is denoted as $\Sigma S1(1n \geq 2)$, and portions of the characters C and G in the right section which qualify are shown in FIG. 3Z.

D. Development Aspects of a Character

The characteristics determined from the development aspect describe how the various characteristics of vertical sections or slices of the character change or develop as the system scans across the character. The first of these, the slope characteristic, is the derivative of the height of the centroid of the vertical portion with respect to the horizontal position of this section. The movement of the portion, the associated centroid locus and the derivative of the locus are shown in FIGS. 3H, 3J and 3K. In theory this derivative depicts the development of the global balance characteristic as the character is scanned. In practice the continuous portion of the derivative curve indicate the presence and direction of slanted (sloping) lines in a character pattern as shown by the examples "M" and "N" in FIGS. 3L and 3M.

The second development characteristic is the curve characteristic. It is the derivative of the radius of gyration (inertial symmetry) of a vertical slice or portion about the bottom axis as the portion moves across the character. The portion movement, associated values of radius of gyration and the derivative thereof are illustrated in FIGS. 3N, 3P and 3R. Theoretically the derivative shows the development of the global radius of gyration as a character is scanned. In practice, continuous positive or negative sections of the derivative graph indicate the presence and direction of converging or curved lines in a character pattern as illustrated in FIGS. 3S and 3T for the letters "O" and "K."

E. Sequential Aspects of a Character

Viewing the pattern from the sequential aspect, the system ascertains the repetitive occurrence of various characteristics of the vertical scanning section as it passes across the character. It detects any sequence of unequal vertical lines in the pattern and it notes any occurrences of a new maximum solid height after a minimum solid height. Such sequences occur in the letters "d," "g" and "q," for example. With regard to repetition the system ascertains the number of vertical or near vertical lines occurring in a pattern. Thus, it records a one for "l," two for "*n*" and three for "m," for example.

II. Normalization

The values of the foregoing global and component characteristics depend not only on the character but also on such factors as size, heaviness of lines and type style or font, as well as position with respect to the scanner. Accordingly, the system includes a normalizing arrangement that converts these characteristics to "fundamental comparision parameters" that tend to be invariant in spite of changes in the other factors. These parameters or more particularly the measured values thereof, are quantified for subsequent comparison with the stored values of corresponding parameters of the prototype characters to obtain a "match" identifying the unknown character. Thus, the parameters for the prototype characters are termed "reference parameters."

I prefer to use one or more of the following fundamental comparison parameters and corresponding reference parameters, derived as indicated from the characteristics of FIGS. 1 through 6.

III. Comparison Parameters

A. Fundamental Global Comparison Parameters

1. Fundamental Centroid Height

Fundamental centroid height ($h_c/h_{c\ max}$) relates to the vertical balance of the character. This ratio of centroid height of the entire character to the centroid height of the maximum section tends to be relatively large if the centroid is above the vertical midpoint of the character and relatively small when the centroid is below the midpoint. The ratio most closely reflects the degree of balance when there is a full-length vertical member in the character, in which case the quantity $h_{c\ max}$ correctly indicates the distance to the vertical midpoint.

It should be noted that normalization is a relatively simple procedure with the various comparison parameters. As shown by fundamental centroid height, merely dividing the vertical centroid height ($h_c$) by the maximum section centroid height ($h_{c\ max}$) largely normalizes $h_c$ with respect to both character height and line thickness, as well as distance from the bottom of the slit 50 (FIG. 2A) to the bottom of the character. The first two factors help to decrease the effect of type style and size on the centroid height. The latter factor, by decreasing the effect of the vertical position of the character, eases the need for accurate positioning of the documents to be scanned by the system. Similar steps normalize others of the following parameters.

2. Fundamental Horizontal Centroid

Fundamental horizontal centroid ($w_c/w_{max}$) indicates the degree of horizontal balance. A ratio of 0.5 indicates balance, i.e., that the centroid is horizontally centered on the character. Values in excess of 0.5 indicate that the character is heavier on the right of its midpoint while values less than 0.5 indicate that it is heavier on the left. Since $w_{max}$ is the overall width of the character, the ratio always closely indicates horizontal balance.

3. Fundamental Gyration Height

The fundamental gyration height ($h_g/h_{smax}$) relates to the dispersion of the character mass along a vertical axis. As the ratio compares the vertical radius of gyration about the center of gravity with the maximum solid height, relatively low values tend to indicate central distribution of the character mass and large values tend to indicate non-central distribution. When the character includes a full-length vertical member, $h_{smax}$ equals the overall height of the character, and the fundamental gyration height more closely reflects centralness of distribution. In that case, a value less than 0.29 corresponds to a central distribution and a value greater than 0.29 corresponds to a non-central distribution.

The constant 0.29 is the approximate value of the fundamental gyration height for a solid rectangle or hollow circle. For purposes of character recognition, I use these two figures as standards for evenly distributed patterns.

4. Fundamental Gyration Width

The fundamental gyration width (the ratio $w_g/w_{max}$) similarly indicates horizontal dispersion, in this case with respect to the left-hand vertical axis of the character. Smaller values of this ratio correspond to concentration of mass near the left-hand axis, while larger values correspond to dispersion away from that axis.

B. Fundamental Component Comparison Parameters

1. Minimum Section Vertical Centroid vs. Maximum Section Vertical Centroid

The ratio ($h_{c\ min}/h_{c\ max}$) compares the centroid of the minimum section with the centroid of the maximum section. This ratio indicates whether the overall (global) value of the normalized centroid height resuls from a relatively uniform condition or from the averaging of disparate (subglobal) centroid conditions of the character. The direction of disparateness is also shown by the ratio. If the ratio equals 1.0, the minimum section and the maximum section of the character are at the same level. Values of the ratio which are more than or less than 1.0 indicate that the minimum section is above or below the maximum section, respectively.

2. Vertical Centroid Non-Maximum Section vs. Maximum Section Vertical Centroid

The ratio ($h_{c\ non\text{-}max}/h_{c\ max}$) compares the centroid of the whole non-maximum section to the centroid of the maximum section. The ratio provides information which is similar to the fundamental component comparison parameter ($h_{c\ min}/h_{c\ max}$). It can be used to provide this information for characters which do not havea minimum section.

3. Centroid Non-Maximum Section vs. Maximum Width

The ratio ($w_{c\ non\text{-}max}/w_{max}$) provides horizontal information analogous to the vertical information obtained from the ($h_{c\ non\text{-}max}/h_{max}$) ratio.

4. Minimum Section Gyration Height

The ratio ($h_{g\ min}/h_{s\ max}$) compares the minimum section radius of gyration of a character to the maximum solid height of the character. The power of this ratio and its consistency from font to font are shown in FIG. 7.

C. Fundamental Special-Case Component Comparison Parameters

1. Midpoint Height

The ratio ($h_{g\ mpt}/h_{s\ max}$) compares the radius of gyration at the midpoint of a character to the maximum solid height of the character. This ratio generally reveals the line geometry of the center of the character. The discriminating capability is similar to that of the Minimum Section Gyration Height which is indicated in FIG. 7.

2. Line Structure in Left Section

The ratio ($h_{s\ max\ tls}/h_{s\ tls}$) compares, within a section comprising the left third of a character, the area of portions in that section that exhibit a solid height near the maximum solid height of this section, to the total area of the character in the section. The ratio approaches unity for characters that contain a vertical line in the left section (like B) because a substantial number of portions are near the maximum solid height for the section and because the moment value of these portions is significantly greater than that of the remaining portions. Conversely, the ratio approaches zero for characters whose lines are curved in this section, as in the case of 8. The curved lines in 8 produce comparatively fewer portions that have a solid height near the maximum solid height and, at the same time, the moment values of these portions are relatively closer in value to those of the remaining portions. As a consequence, the value of this ratio depends primarily on a character's geometry while the effect of character size and line thickness are relatively small.

3. Line Structure in Right Section

This comparison parameter is useful in distinguishing C from G and Q where the differentiating traits are found in the line structure in a section comprising the right half of the character. The ratio ($\Sigma S1_{(1n=2)}/\Sigma S1_{(1n \geq 2)}$) yields a value independent of character size. If a character has only one line in the second half the ratio is indeterminate (i.e., it is 0/0); the circuitry in FIG. 11D detects this condition. If portions in this section have one and two lines, or two lines exclusively, the ratio if 1.00, independent of character size. If portions have more than two lines, the ratio approaches zero in a manner generally independent of character size. Overall the ratio approaches zero as a direct function of the number of two-line portions and the number of two-or-more line portions. The ratio approaches zero more rapidly than the proportion of the numbers of portions with two or more lines since the use of first order moments in the ratio gives greater weight to a three-line portion than a two-line (assuming constant line thickness).

D. Fundamental Line Comparison Parameters

These comparison parameters are based upon the development aspects of a character. They identify slope and curve characteristics and are computed in a way which is independent of character size, height and thickness of lines. They may be used directly as fundamental line comparison parameters. These parameters include:

1. A slope comparison parameter which indicates the presence, number, direction, and sequence of slanted lines and the direction of slants. For example, there may be a single slant to the left or right, a slant left before a slant right, or vice versa, or no slants at all.
2. A curve comparison parameter indicates the presence, number, direction, and sequence of curved (horizontally converging or diverging) lines. For example, there may be no curve, a single diverging or converging curve, a diverging curve before a converging curve, or vice versa.

In sensing these curves, the system treats them as double slope sections. For example, a curve left, e.g. "C," is treated in the same fashion as a double slope left: "<." Thus, angularity is disregarded in curved sections.

E. Fundamental Pattern Comparison Parameters

Characteristics based upon the sequential aspect of a character do not relate to the physical attributes of a character, per se, but rather to line patterns which contribute to the physical attributes. As indicators of line patterns, these characteristics are already independent of size, height, and line thickness and can be used as fundamental comparison parameters directly. They include:

1. A sequential comparison parameter which indicates that a character contains either a single vertical line or that the rightmost line is higher than all other vertical lines in the character.
2. A repetitive comparison parameter which indicates the number of vertical or near vertical lines that are contained by a character.

SPECIFIC DISCUSSION

I. Sensing Apparatus

Figure 8:
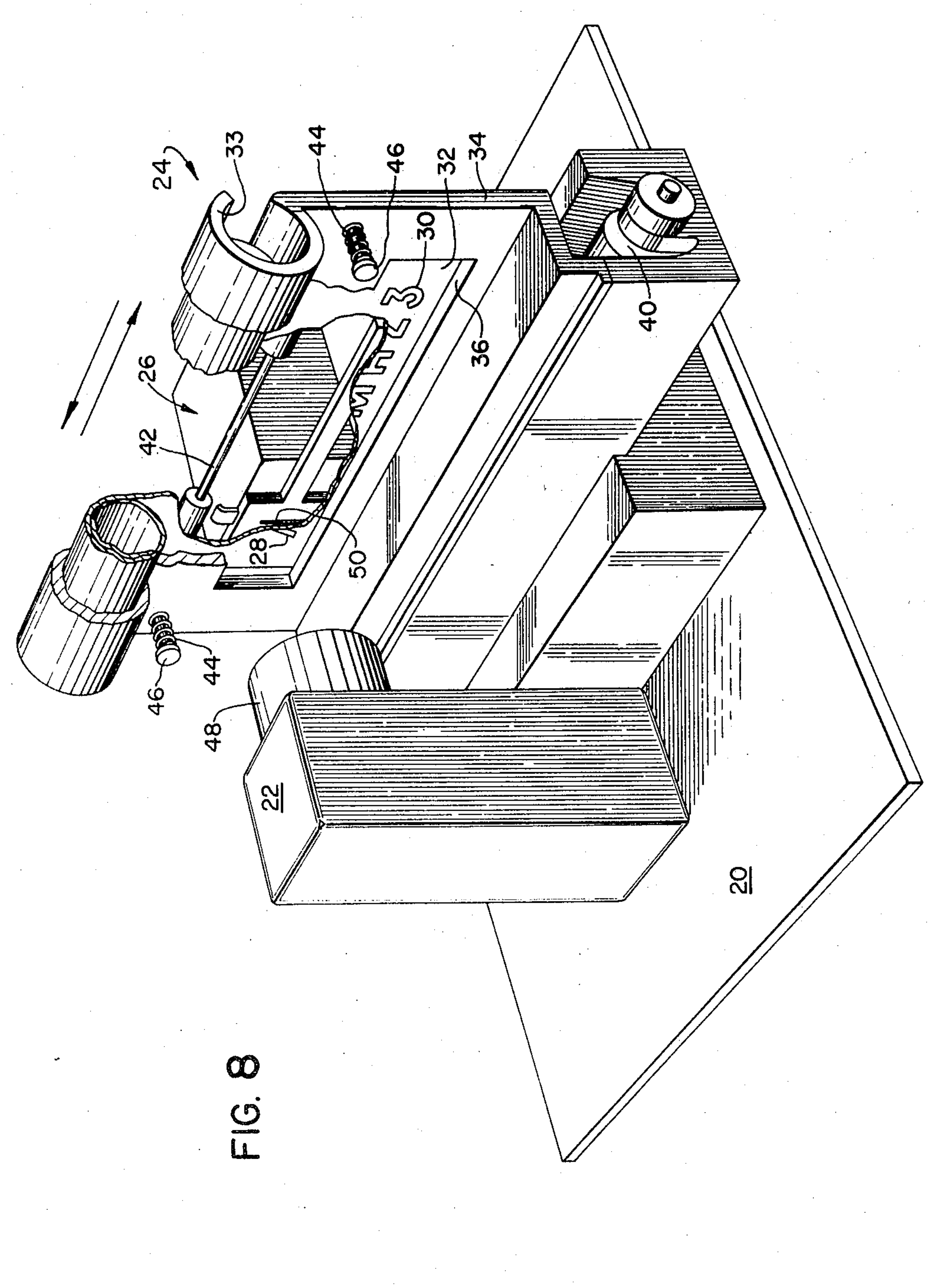
FIG. 8 is a pictorial view of a character recognition system embodying the invention.

In FIG. 8, I have illustrated the overall mechanical arangement of a characer recognition system embodying the invention. The major mechanical components of the recognition system includes a base 20, a light source 22, a document-carrying transport assembly 24 and a sensor unit 26. The system reads cahracters, such as characters 28 and 30, defined by transparent areas in a document 32 having an opaque background. The document 32 is disposed in a carrier generally indicated at 34.

The document 32 passes from a feed bin 33, behind the film carrier 34 and past a window 36 in the carrier 34 to a take-up roll 40. A hold-down bar 42, forced against the document 32 springs 44 acting on pins 46, maintains the document 32 in a taut condition over the window 36 so as to accurately position the document for sensing of the characters.

The light source 22 projects an even-intensity collimated beam of light through a focusing lens 48 toward the window 36, thence through the transparent parts of the document 32 and on to a vertically oriented aperture or slit 50 in the sensor unit 26.

The transport assembly 24 may be similar to a typewriter carriage, except that it moves continuously rather than intermittently. It travels horizontally along the base 20 and thereby transports successive vertical portions of the document 32 past the slit 50. Thus light passing through successive portions or slices of a line of characters 28 through 30 enters the slit 50. In this manner the slit effectively sweeps along the line in a scanning operation.

Figure 9:
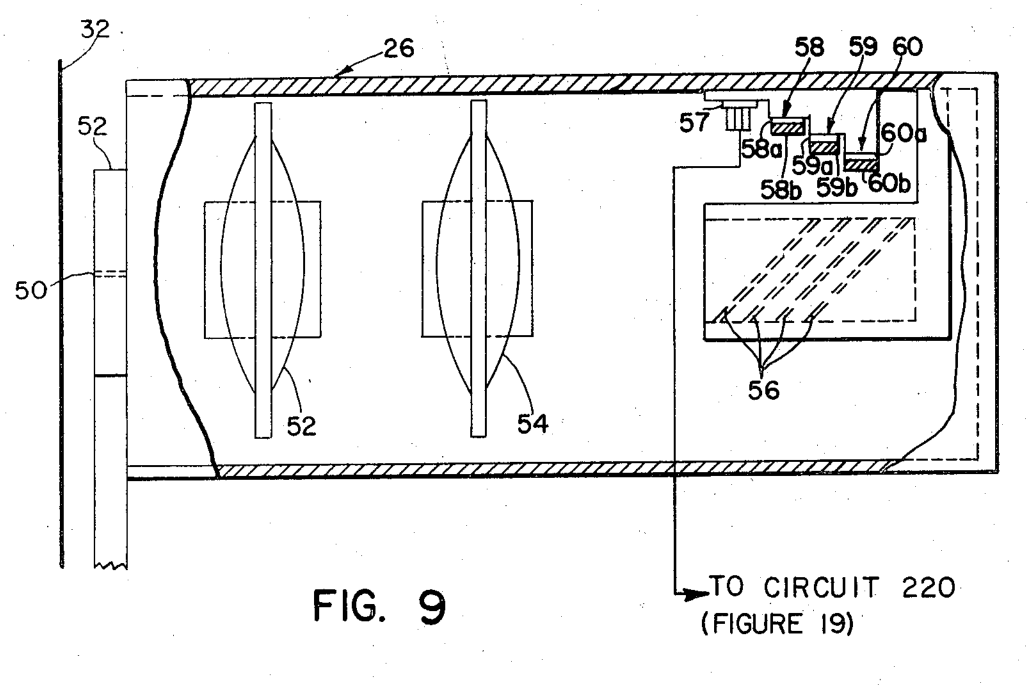
FIG. 9 is a top view of the sensor unit incorporated in the system of FIG. 8, with the cover broken away to show a disposition of interior parts.

By way of explanation, FIG. 9 shows one embodiment of the sensor unit 26. It has a light-tight enclosure with the vertical slit 50 cut through one end wall 52. As the document 32 moves by the slit 50, the slit passes a narrow vertical band of light from a continuous succession of slices or portions of the characters imprinted on the document. Inside the sensor unit 26, the light from the slit 50 passes through lenses 52 and 54 to a set of four partial reflectors 56. The reflectors 56 reflect images of the slit 50 and the light passing through it to a photo-array 57 and a plurality of photodetectors 58 through 60. The photodetectors comprise photocells 58*a* through 60*a* positioned behind light filters 58*b* through 60*b*, respectively.

Figure 10:
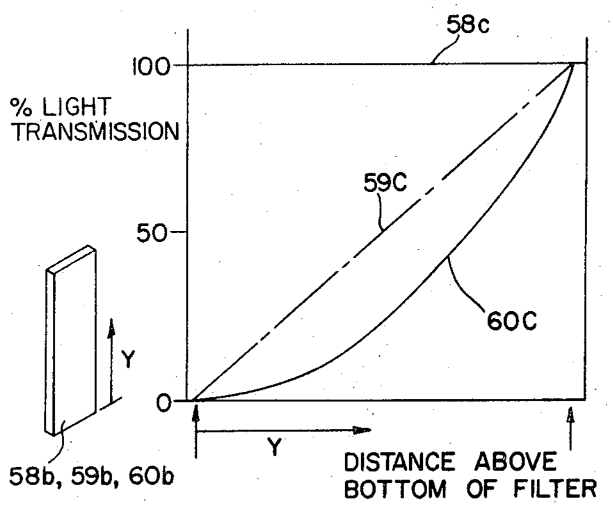
FIG. 10 is a graphical representation of the characteristics of the light filters used in the sensor unit.

The transmittance of the light filter 58*b* is constant along its vertical length (perpendicular to the plane of FIG. 9), while the transmittances of filters 59*b* and 60*b* vary from one end to the other. FIG. 10 illustrates the transmittance profile for each filter, the transmittance for filter 58*b* being represented by the line 58*c*. The transmittance of light filter 59*b* varies linearly from one end to the other in accordance with line 59*c* while the transmittance of filter 60*b* varies as the square of the distance from the bottom end in accordance with the curve 60*c*.

The output signal of each photocell 58*a*–60*a* varies in accordance with the total light flux impinging on it. Accordingly, the output of photocell 58*a* (signal $S\phi$) is proportional to the light flux through the slit 50 and independent of the distribution of the light along the slit. In terms of the transparent characters 28–30, the instantaneous output of the photocell 58*a* is therefore proportional to the solid height of the character slice transmitting through the slit 50 at that time and independent of the distribution of solid height over the length of the slit. Thus, at any given time, the signal $S\phi$ corresponds to the zero order moment of the character portion or slice then in front of the slit 50.

On the other hand, with the linearly varying transmittance of the filter 59*b*, the output of the photocell 59*a* (signal S1) is linearly related to the vertical position of each sefment of the character. The signal S1 therefore represents the first order moment of the character portion in front of the slit 50. Similarly a signal S2 from the photocell 60*a* represents the second order moment, because the output of photocell 60*a* is a function of the light through the slit 50 and the square of the height at which it passes through the filter 60*b*. The three signals $S\phi$, S1, and S2 are primary signals from which the system derives all of the information required for character recognition.

II. Circuits for Generating Comparison Parameters

The electronic circuitry shown in FIGS. 11A, 11B, 11C and 11D responds to the three primary signals from the sensor unit 26 to derive signals representing the various fundamental comparison parameters defined above.

Figure 11A:
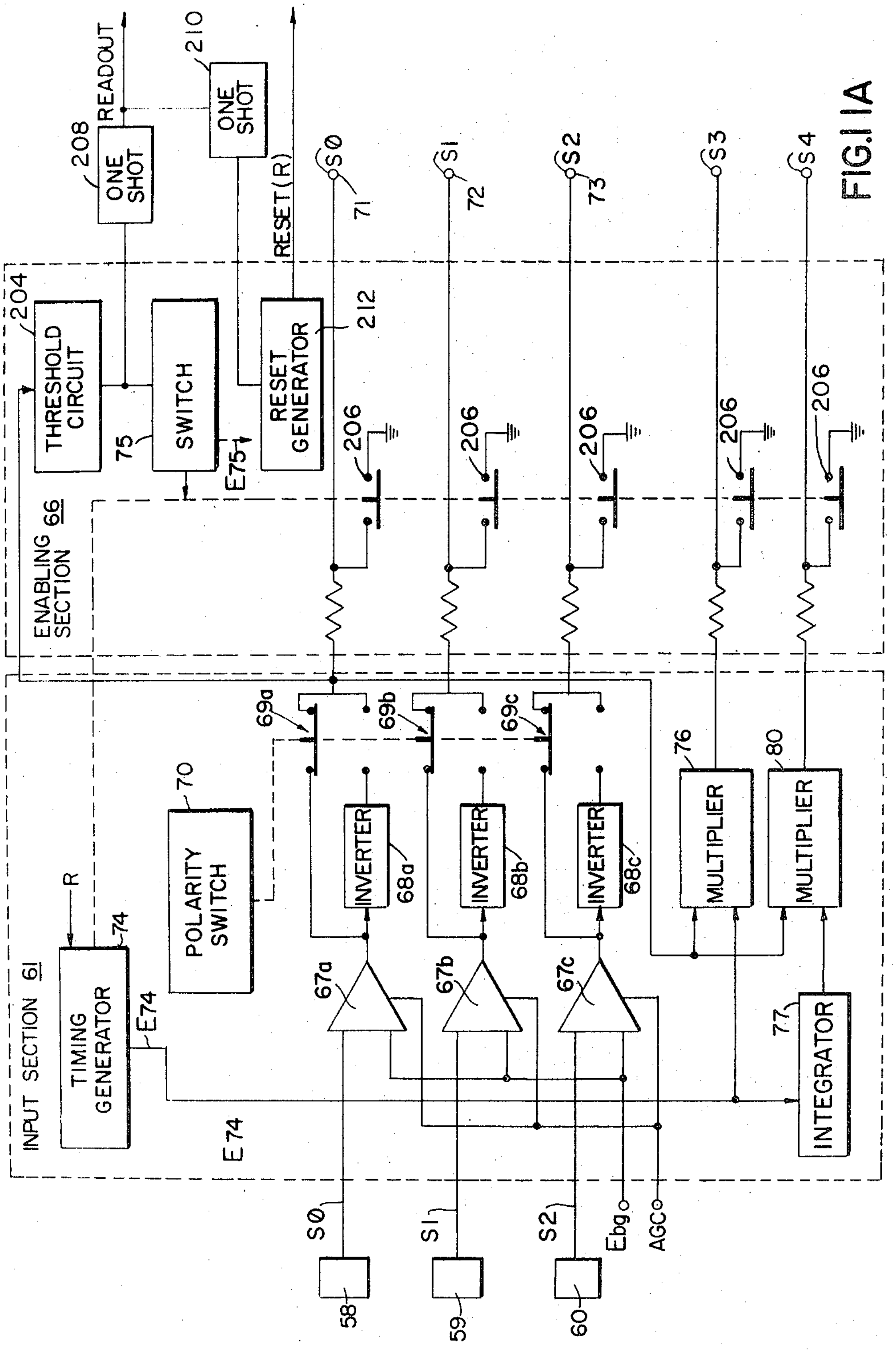
FIGS. 11A, 11B, 11C and 11D, are schematic diagrams, largely in block form, of the electronic circuitry employed in the system.

An input section 61 shown in FIG. 11A amplifies and modifies the primary signals and generates two additional moment signals S3 and S4 to provide the inputs for the sections 62, 63, and 300. Signal processing sections 62, 63 and 300 (FIGS. 11B, 11C and 11D) derive the various fundamental comparison parameters from the signals $S\phi$ through S4. A quantifier 64 (FIG. 11C) assigns scale values to certain of these comparison parameters and thereby develops a set of scaled parameter values for each scanned character. Finally, a decoder 65 compares each set of scaled comparison parameter values with stored sets of reference parameters of prototype characters and provides an output identifying each scanned character.

An enabling section 66 (FIG. 11A) controls the operations of the various circuits by issuing start, stop, and reset commands.

The individual sections 61, 62, 63 and 300 will now be described in detail.

A. Input and Enabling Sections

Referring first to the input section 61 of FIG. 11A, the primary signals $S\phi$, S1 and S2 are individually applied to variable-gain difference amplifiers 67*a*, 67*b* and 67*c* respectively. A reference voltage $E_{bu}$ is also supplied to each amplifier; this reference voltage is a function of the background on the scanned document and is set to produce a zero amplifier output if only background is being scanned. Amplifier gain is controlled in response to character contrast as represented by an AGC voltage described in more detail later. The AGC voltage varies in accordance with the output voltage to reduce the effects of document contrast variations on the primary signals.

After being amplified and compensated for contrast, the signals may be inverted in inverters 68*a*, 68*b* and 68*c* depending upon the position of switch contacts 69*a*, 69*b* and 69*c* controlled by a polarity switch 70. If light characters on a dark field are to be read, the operator sets the polarity switch to maintain the contacts 69 as shown so the signals bypass the inverters 68. If dark characters on a light field are to be read, the operator reverses the switch 70 to shift contacts 69 and thereby connect the inverters into the circuit.

As a result, the signal levels at junctions 71, 72 and 73 are normally zero when light through the slit 50 in the sensor unit 26 of FIG. 9 comes solely from background and are positive when a character is passing the scanning slit 50.

In addtion to conditioning the signals $S\phi$, S1 and S2, the input section 61 generates a timing voltage proportional to character scanning time. This timing voltage, $E_{74}$, is generated by a timing generator 74, which, in its simplest form comprises an integrator whose input is a constant voltage. Integration is initiated by a switch 75 which is turned on as described below, in response to the first appearance of each character at the slit 50. The switch 75 is turned off when the last portion of the character has been scanned and this terminates integration. Since each character is canned at a constant sped, the signal $E_{74}$ also represents the distance X from the left-hand edge of the character to the character portion being sensed at any given time. At the end of integration, $E_{74}$ represents the total width of the character ($W_{max}$).

The input section 61 responds to the voltage $E_{74}$ and the primary signal $S\phi$ to generate signals S3 and S4. The signal S3, which is the product $S\phi \cdot X$, is provided by a multiplier 76. This signal represents the first moment of each vertical character slice about the left-hand vertical axis C—C (FIG. 3B). The signal S4 is obtained by first applying the time voltage $E_{74}$ to an integrator 77 to obtain a voltage proportional to $(E_{74})^2$ and thus representative of $X^2$. The latter voltage is applied to a multiplier 80 to obtain the signal S4, which is the product $S\phi \cdot X^2$. The signal S4 thus represents the second order horizontal moment about the axis C—C.

Figure 11B:
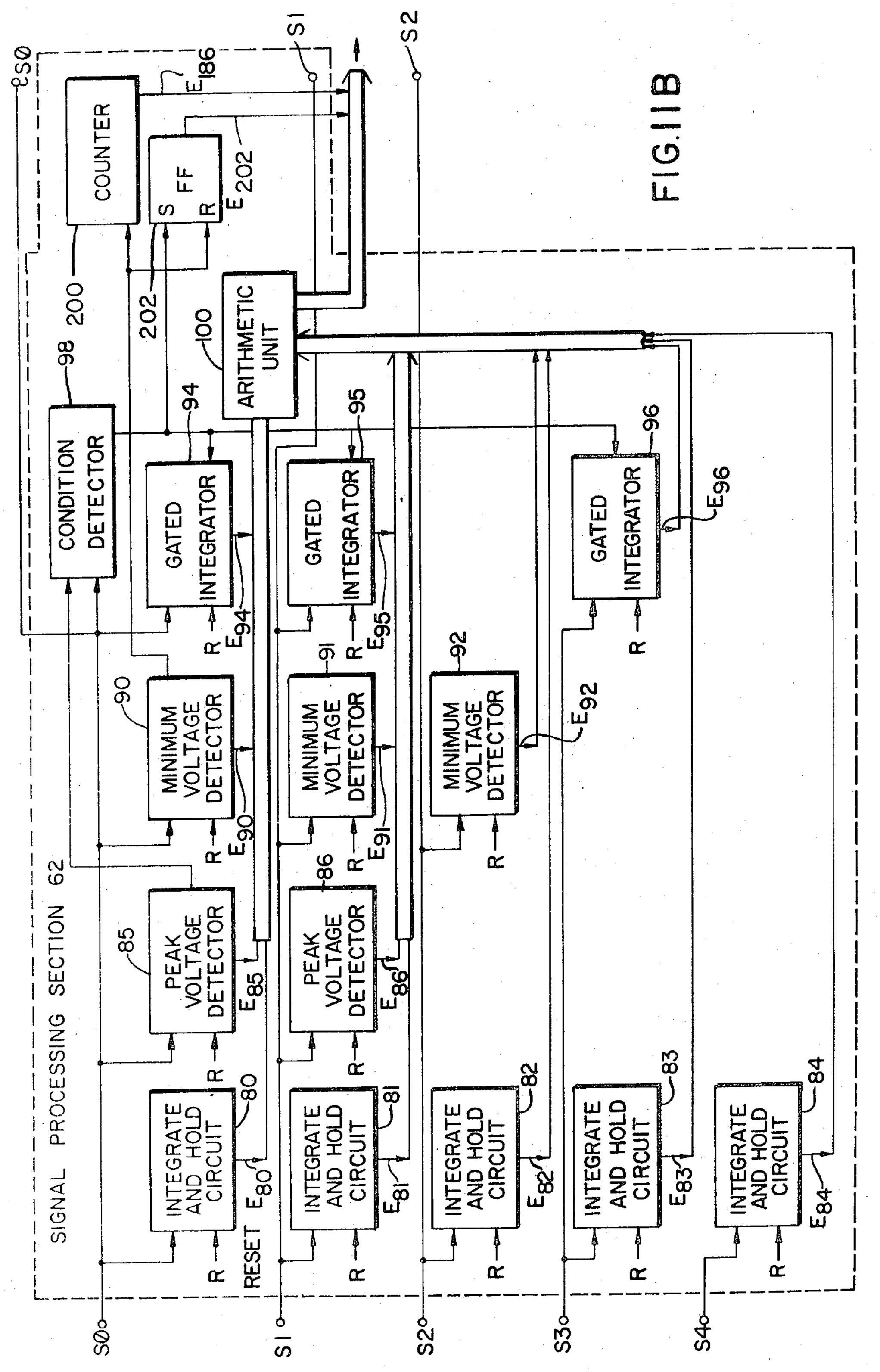
Figure 11C:
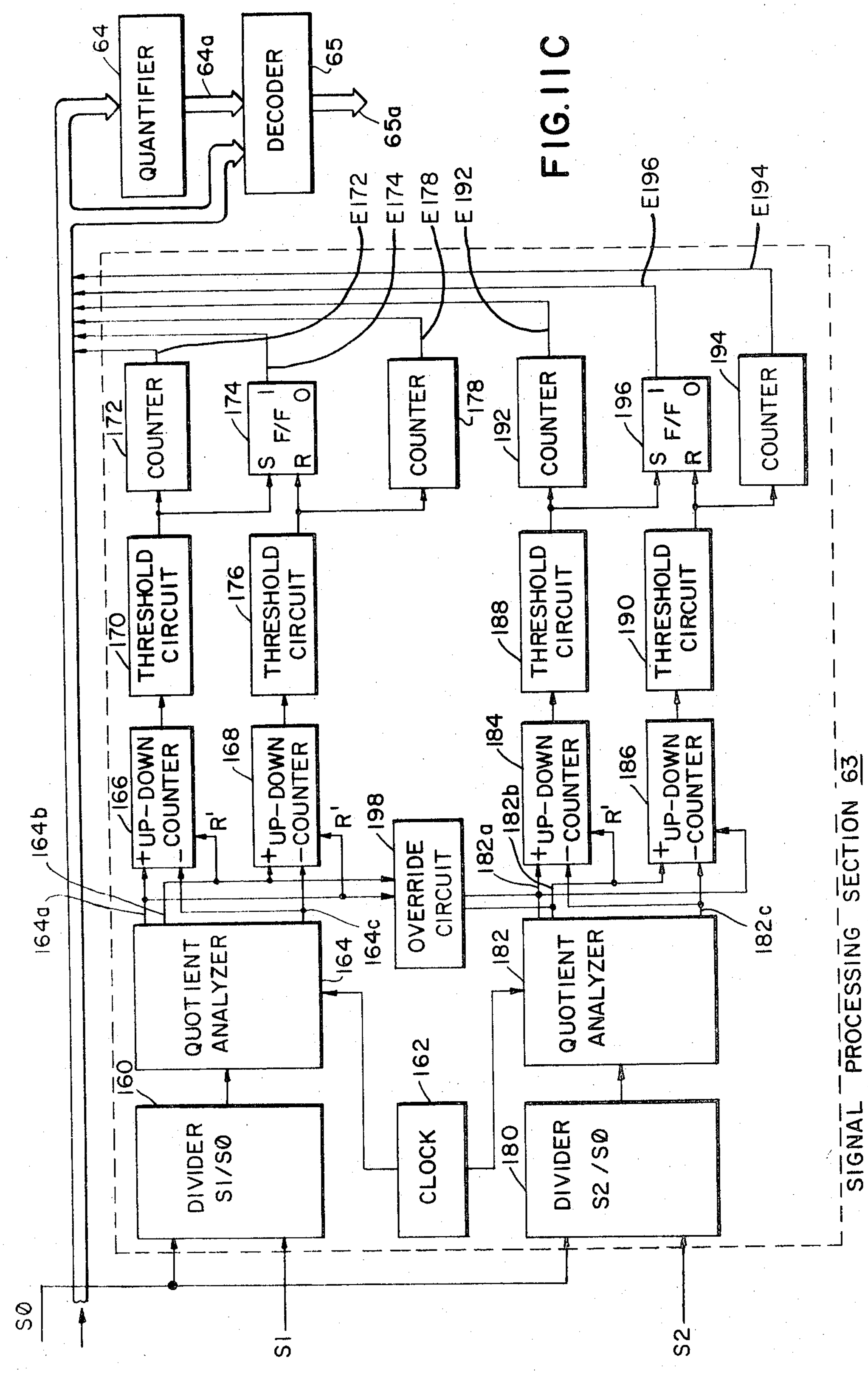
Figure 11D:
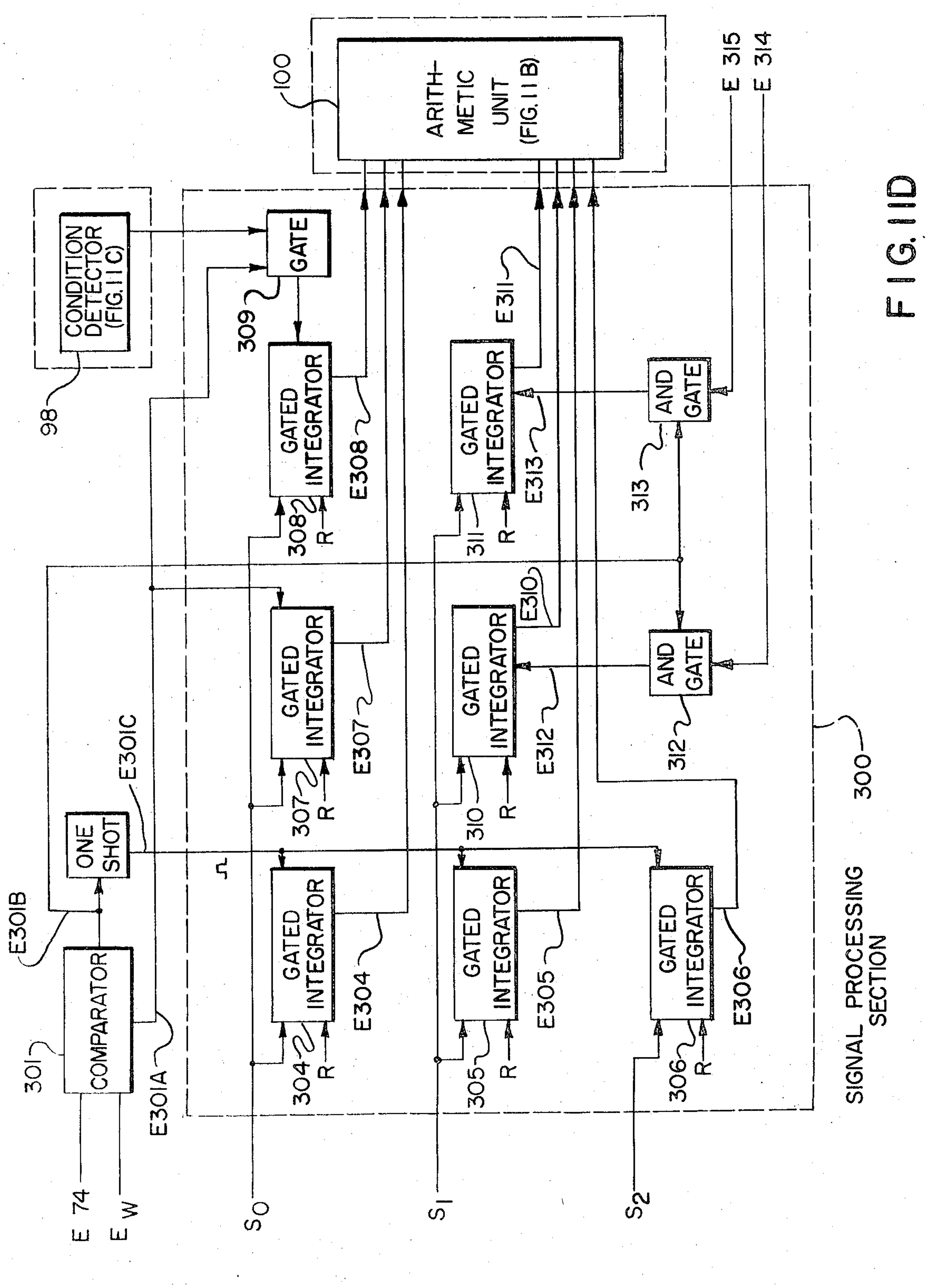

The amplified signals from the input section 61 pass through the enabling section 66 for application to the processing sections 62, 63 and 300 (FIGS. 11B, 11C and 11D).

B. Signal Processing Section 62

With reference to FIG. 11B, signals representing the zero, first and second order moments of entire characters are obtained by applying the signals $S\phi$–S4 to intergrate-and-hold circuits 80 through 84. Other signals are obtained by applying the signals $S\phi$ and S1 to peak-voltage detectors 85 and 86, respectively. In addition, the signals $S\phi$, S1 and S2 are applied to minimum voltage detectors 90 through 92 while signals $S\phi$, S1 and S3 are applied to gated integrators 94 through 96.

The integrate-and-hold circuits 80 through 84 integrate their inputs and maintain the results of the integrations until reset to zero by a reset (R) signal. The peak voltage detectors 85 and 86 detect and hold the respective peak values until reset. The minimum voltage detectors operate in somewhat similar fashion. The gated integrators 94 yhrough 96 are controlled by a condition detector 98 to integrate the signals $S\phi$, S1 and S3 for brief interval bracketing the occurrence of the maximum value of the signal $S\phi$. They thereby provide the moments of a narrow section of each character near its maximum solid height. Such sections are called "maximum sections."

The output voltages of the various units in the processing section 62 thus represent the values of the following parameters:

- $E_{80}$ — character area; i.e., area of the solid part of the character;
- $E_{91}$— first order moment (moment of inertia) of character about horizontal axis B—B (FIG. 3B);
- $E_{82}$— second order moment of character about axis B—B (FIG. 3B);
- $E_{83}$— first order moment of character about left-hand vertical axis C—C (FIG. 3B);
- $E_{84}$ — second order moment of character about axis C—C;
- $E_{85}$— maximum solid height of character ($h_{s\,max}$);
- $E_{86}$— maximum first order moment, about axis B—B, of a thin vertical section of the character;
- $E_{90}$— minimum solid height of character ($h_{s\,min}$);
- $E_{91}$— first order moment, about axis B—B, of a thin vertical section;
- $E_{92}$— minimum second order moment, about axis B—B, of a thin vertical section;
- $E_{94}$— total area of narrow, vertically extending sections of a character comprising portions of maximum solid height;
- $E_{95}$— total first order moment, about axis B—B, of narrow, vertically extending sections of character comprising portions of maximum solid height;
- $E_{96}$— total first order moment, about axis C—C of narrow, vertically extending sections of character comprising portions of maximum solid height.

Figures 2B, 2C:
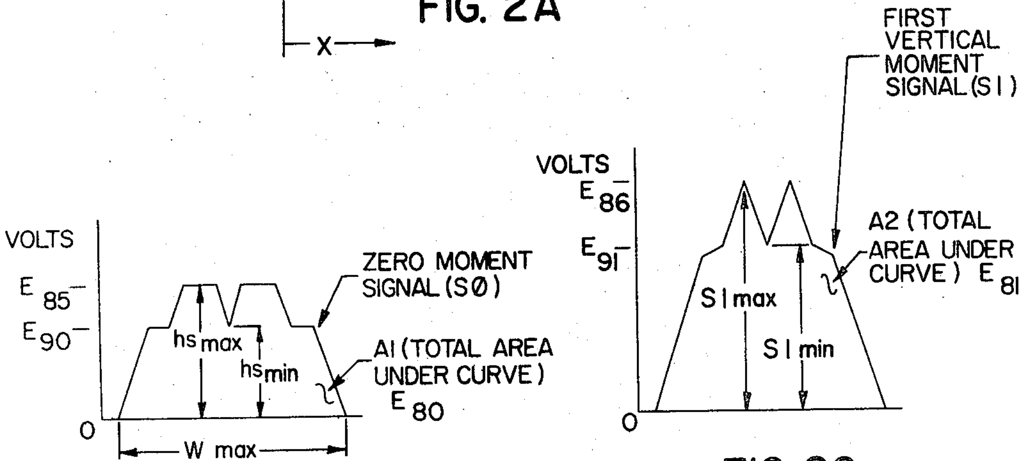

FIGS. 2B through 2H illustrate graphically some of the signals developed by the circuitry thus far described when the letter "A," as illustrated in FIG. 2A, is being scanned by the system. FIG. 2B represents the zero moment signal $S\phi$ as a function of the horizontal position of the slit 50 (FIG. 2A) relative to the letter. The instantaneous value of $S\phi$ represents the solid height of that portion of the character passing through the slit 50 at that time. The integral of $S\phi$, the area of the character, is represented by the voltage $E_{80}$ as noted above. The voltages $E_{85}$ and $E_{90}$, representing the quantities $h_{s\,max}$ and $h_{s\,min}$, are also indicated in FIG. 2B. In this connection it will be helpful to compare the regions of maximum vertical section in FIGS. 3C and 3F.

Figure 2D:
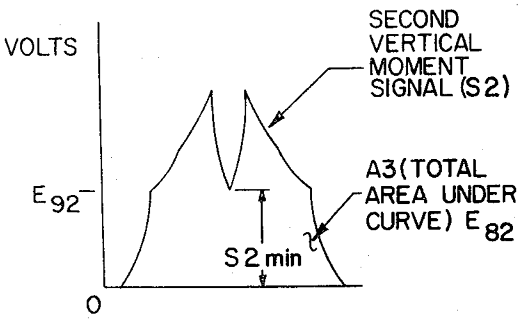
Figure 2E:
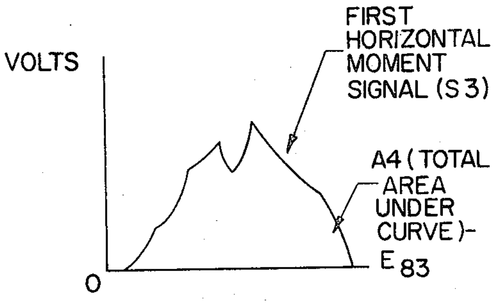

In like manner, FIGS. 2C and 2D illustrate the first and second order moment signals S1 and S2 and the voltages representing their integrals, maximum and minimum values. FIGS. 2E and 2F are similarly related the moment signals S3 and S4 for first and second order moment about the vertical axis, except that maximum and minimum values of these signals are not detected in the signal processing section 62 (FIG. 11B).

FIGS. 2G, 2H and 2J illustrate the operation of the gated integrators 94 through 96. As noted above these integrators integrate the signals $S\phi$, S1 and S3, respectively, in the sections where portions exhibit maximum solid height, (i.e., maximum of the signal $S\phi$). If there are two or more such maxima in a character, the gated integrators will sum the integrals embracing all of them. They also will reset and then sum the integrals around successively greater maxima. These sums are subtracted from the total areas of the $S\phi$, S1 and S3 signals to provide the non-maximum areas indicated by the shaded sections of FIGS. 2G, 2H and 2J. The use of sections characterized by non-maximum portions is described below.

C. Signal Processing Section 300

In addition, the signal E74 also drives a comparator circuit 301 shown in FIG. 11D, which identifies sections of the character used in the computation of special-case component comparison parameters. As previously indicated, the signal E74 represents the distance from the left-hand edge of the character. The comparator 301 compares this voltage against two thresholds. A first represents the end of the section comprising the left-hand third of the character; the second threshold indicates the beginning of the section comprising the second half of the character. Fixed thresholds are sufficient when the width of all characters is the same. If the width can be determined beforehand, the thresholds can be varied. For purposes of this discussion a voltage Ew is set equal to the expected width of the character ($W_{max}$). A voltage divider network in the comparator 301 then provides the threshold voltages. When the voltage E74 exceeds the first threshold, the comparator 301 terminates its transmission of a voltage E301 A thus indicating the end of the first third of the character being scanned. When the E74 voltage exceeds the second threshold, the comparator 301 begins transmitting an E301B voltage to indicate the right half of the character. The leading edge of the E301B voltage also triggers a one-shot multivibrator 302 to produce an E301C pulse indicating the midpoint of the character.

Still referring to FIG. 11D, the signal processing section 300 receives the amplifier Sφ, S1 and S2 signals from the enabling sector 66 (FIG. 11A). Gated integrators 304, 305 and 306 respond to these signals to transmit signals representing new first and second order moments, respectively at the center of the character. The E301C pulse from the one-shot multivibrator 302 enables the integrators for the duration of the pulse.

A gated integrator 307 which receives the Sφ signal is gated on by the E301A signal. Thus an E307 signal represents the zero order moment for the left third section of the character. The Sφ signal is also integrated by a gated integrator 308. A gating circuit 309 receives signals from condition detector 98 (FIG. 11C) and the E301A signal and enables the integrator 308 whenever the Sφ is at a maximum in the left third section of the character.

Gated integrators 310 and 311, under the control of gates 312 and 313 respectiveyly, receive the S1 signal. Both gates 312 and 313 are enabled during the time the system scans the right half of the character by the E301B signal. E314 and E315 signals from a line counting circuit 3156 (FIG. 19) energize the gates. Specifically, the gate 312 energizes the integrator 310 only when exactly two separate lines appear in the right section. The gate 313 energizes the gated integrator 311 when two or more separate lines appear in the right section.

The outputs of these integrators in Fig. 11D thus indicate the special-case component characteristics as follows:

- $E_{304}$— the area of a narrow, vertically extending section of a character at its horizontal midpoint.
- $E_{305}$— first order moment, about axis B—B, of a narrow vertically extending section of character at its horizontal midpoint.
- $E_{306}$— second order moment, about axis B—B of vertically extending section of chracter at its horizontal midpoint.
- $E_{307}$— total area of the left third section of character
- $E_{308}$ — total area of a section comprising narrow vertically extending portions of maximum solid height within the left third section of character
- $E_{310}$ — total first order moment about horizontal axis B—B (FIG. 3B) of vertically extending portions of the right half section of the characer in which portions contain two lines.
- $E_{311}$— total first order moment about horizontal axis B—B (FIG. 3B) of vertically extending portions of the right half section of the character in which portions contain tow or more lines.

Figures 2L, 2M, 2N, 2P, 2R, 2S:
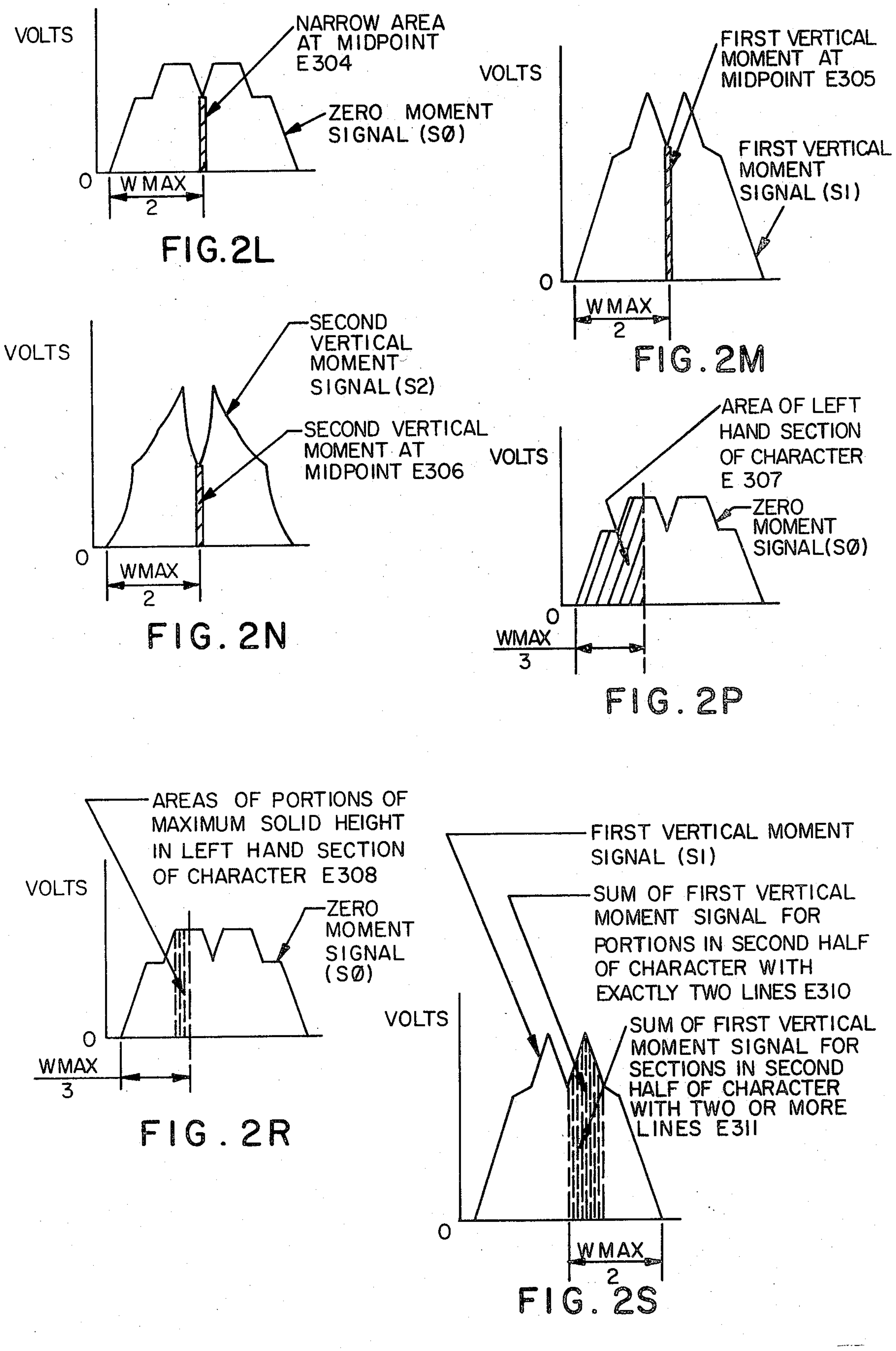

FIGS. 2L, 2M and 2N illustrate the operation of the gated integrators used in the processing section 300. Gated integrators 304 through 306 integrate the SφS1, and S2 signals respectively over a narrow section located at the midpoint of the character.

Gated integrator 307 integrates the Sφ in the left third section of the character; more specifically, during the first third of the character's width as shown in FIG. 2P Gated integrator 308 which is similar to gated integraotr 94 integrates the Sφ signal in the region of maximum solid height, except that gated integrator 308 only operates while the system scans the left third section of the character. Thus, it integrates only in the region of the maximum solid height reached in the left hand portion of a characte and, not necessarily in the region or regions of the maximum solid height for the character as a whole. The operation of this integrator is shown in FIG. 2R.

FIG. 2S illustrates the operation of gated integrators 310 and 311 which integrate the S1 signal during the second or right half of a character when portions contain two lines (gated integrator 310 ) or two or more lines (gated integrator 311). In the case of letter A, its portions in the right half section contain only two or more lines and, consequently, both gated integrators 310 and 311 operate over the same region.

D. Signal Porcessing Section 62

As shown in FIGS. 11B, 11C, and 11D, the processing sections 63 and 300 respond to the signals Sφ, S1 and S2 as well as signals from the minimum voltage circuit 90 and the gated integrator 94.

After each character has been scanned, an arithmetic unit 100 (FIG. 11B) computes the various fundamental global, component and special-case component comparison parameters from the voltges $E_{80}$ through $E_{96}$, and $E_{304}$ through $E_{311}$. These are the first twelve parameters listed in FIG. 12, which also sets forth the formulas followed to obtain the parameter values. The operations indicated in the formulas can be performed by circuits that are well-known and therefore need not be described in detail. On the other hand, a discussion of the relationships of some of these formulas to the foregoing definitions of the fundamental global and component comparison parameters will aid in understanding the invention.

First, however, it will be helpful to go into the exact derivation of the hybrid parameters $h_{c\ max}$, $h_{c\ min}$, and $h_{g\ min}$. As mentioned above, the centroid height of a character, $h_c$, is the ratio of the first order moment to the area (or zero moment). Similarly, centroid height of any vertical portion or slice is the ratio of the first order moment of that portion to the solid height of that portion. Thus, the centroid height of the character portion being sensed at any given time corresponds to the signal ratio S1/Sφ at that time.

Accordingly, the centroid height of the maximum section $h_{c\ max}$ is the ratio of the first order moment to $h_{s\ max}$ at the section where $h_{s\ max}$ occurs. In terms of the signals developed by the circuit this is the ratio of S1, at the time the peak of Sφ (E85) occurs, to the peak of Sφ. Actually, the system uses the ratio E86/E85, where E86 corresponds to the peak value of the first order moment. The peak of the first order moment will ordinarily have the same horizontal position as $h_{s\ max}$, but not necessarily always. To the extent that they do not coincide, the ratio (E86/E85) will not correspond to an actual centroid height, but rather to a hybrid parameter referring to different parts of the character.

The same reasoning applies to $h_{c\ min}$. The ratio (E91/E90) which the system uses for this parameter compares the minimum first order moment (E91) with the minimum solid height (E90) and these maxima may occur at different horizontal positions on the character. The parameter $h_{g\ min}$, which, as determined by the system, is the ratio (E92/E90)is subject to the same type of departure.

I find that these hybrid parameters are particularly useful in character recognition.

As defined above, the fundamental centroid height is the ratio of the centroid height of the whole character ($h_c$) to the hybrid maximum section centroid height ($h_{c\ max}$). The first factor, $h_c$ (i.e., the ratio of the first vertical moment to the area of the entire character) is represented by the signal ratio (E81/E80). The second factor, $h_{c\ max}$, is represented by the signal ratio (E86/E85) as noted above. The ratio $h_c/h_{c\ max}$ is therefore represented by formula indicated in FIG. 12.

In the ratio $h_{c\ non\text{-}max}/h_{c\ max}$, the quantity $h_{c\ non\text{-}max}$ is the centroid height of the non-maximum section of the character, i.e., a section comprising those portions or slices of the characer left over after all the maximum sections have been extracted. (See FIG. 3G). $_{c\ non\text{-}max}$ is, therefore, the ratio of the non-maximum first order moment to the nonmaximum area of the entire character. The first of these factors is represented by ($E_{81}$—$E_{95}$) (FIG. 2H) and the second by ($E_{80}$–$E_{94}$), (FIG. 2G). The ratio of these quantities, divided by the voltage ratio E86/E85, representing $h_{c\ max}$, is the formula set forth in FIG. 12, Parameter No. 6.

The apparent complexity of the formulas for $h_g/h_{s\ max}$ and $h_{g\ min}/h_{s\ max}$ (Parameters Nos. 3 and 8) results from a translation of axes. The radius of gyration as measured by the system (E82/E80) is the radius about a horizontal axis at the bottom of the slit 50 (FIGS. 2A and 8) while the values of $h_g$, $h_{g\ min}$ and $h_{g\ mpt}$ are taken with respect to the centroid. The measured radius is therefore modified according to the height of the centroid of the entire character above the bottom of the slit (E81/E80) to arrive at the formula for $h_g/h_{s\ max}$. The formulae for $h_{g\ min}/h_{s\ max}$ and $h_{g\ mpt}/h_{s\ max}$ are similarly derived from the corresponding signals relating to the minimum and midpoint sections of the character.

The quantifier 64 (FIG. 11C) includes quantizers that assign scale values to the parameter values computed in the arithmetic unit 100 (FIG. 11B). Typically, the scale values may be integral values in the ranges indicated in FIG. 12.

III. Circuit Details

Figure 13:
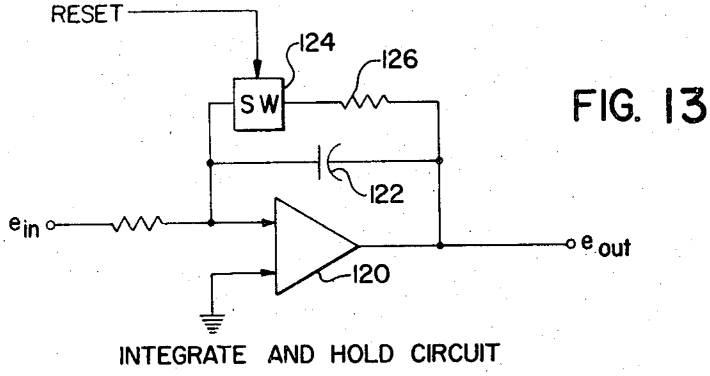
FIG. 13 is a schematic diagram of an integrate and hold circuit used in the system.

FIGS. 13 through 19 show details of units in the signal processing circuits. With reference to FIG. 13, each of the integrate-and-hold circuits 80 through 84 comprise a high-gain amplifier 120 and a feedback capacitor 122 connected to operate as a conventional integrator. Thus, the output voltage $e_{out}$ is the time integral of the input voltage $e_{in}$ and will be held until a reset switch 124 is closed so as to discharge the capacitor 122 through a resistor 126.

Figure 14:
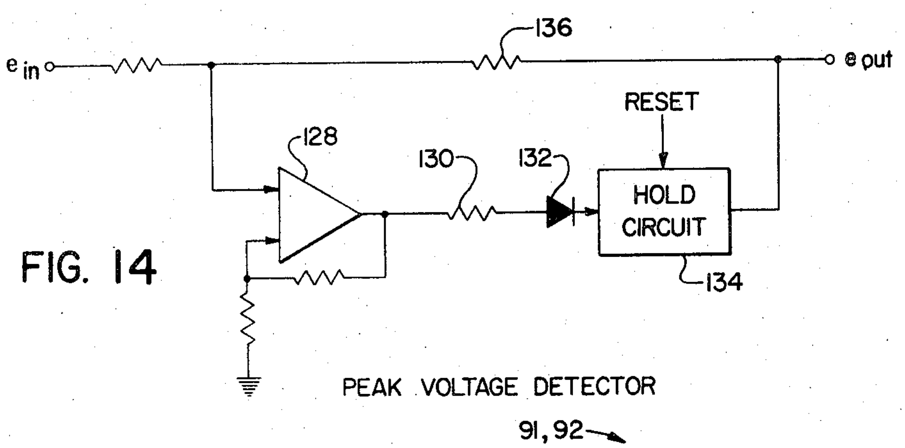
FIG. 14 is a schematic diagram of a peak voltage detector.

The peak voltage detectors 85 and 86 are shown in FIG. 14. An input $e_{in}$ is resistively coupled to an amplifier 128. The output of the amplifier is applied through a resistor 130 and a diode 132 to an integrate-and-hold circuit 134 of the type depicted in FIG. 13. Negative feedback is provided by a resistor 136 coupling the output of the circuit 134 to the input terminal of the amplifier 128. The circuit 134 has a relatively short time constant so that it can follow variations in the input voltage $e_{in}$. As long as $e_{in}$ increases, the output of amplifier 128 forward biases the diode 132 and the output voltage $e_{out}$ also increases. However, when the input signal stops increasing, the diode 132 is reverse biased thereby cutting off the input to the integrate-and-hold circuit 134. The circuit 134 thus ceases to integrate and it holds its output signal at the maximum or peak signal level.

Figure 15:
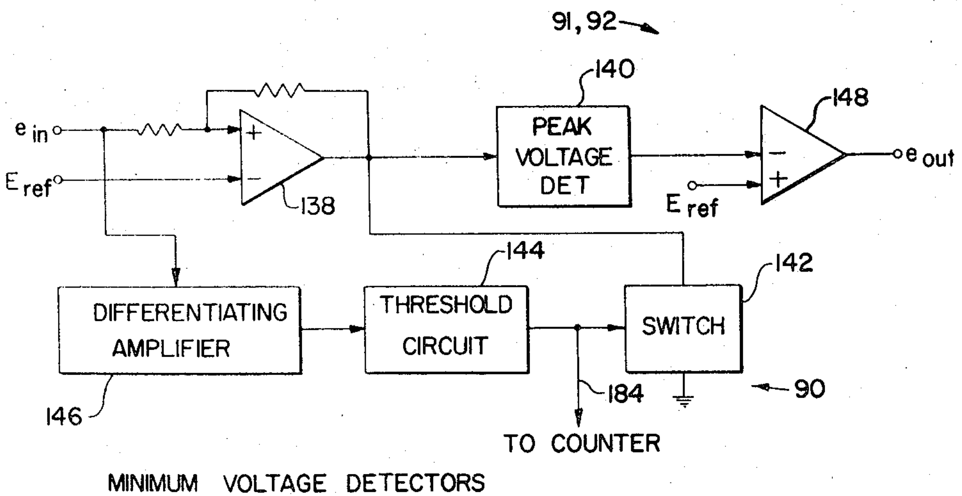
FIG. 15 is a schematic diagram of a minimum voltage detector.

FIG. 15 illustrates minimum voltage detectors representative of the detectors 90 through 92 of FIG. 11B. An input signal $e_{in}$ is resistively coupled to the positive input terminal of a difference amplifier 138 while a reference voltage $E_{ref}$ is directly applied to the negative input terminal. The resulting difference ($e_{in}$–$E_{ref}$) is inverted by amplifier 138 so that a minimum input voltage appears as a maximum. The output voltage of amplifier 138 is applied directly to a peak voltage detector 140, whose input terminal is grounded by a normally closed switch 142. The switch 142 is controlled by a threshold circuit 144, whose input is the time derivative of $e_{in}$ as provided by a differentiating amplifier 146. With this arrangement, the threshold circuit 144 responds to positive-going zero crossings of the slope $e_{in}$ (i.e., minima of $e_{in}$) to momentarily open the switch 142 and permit operation of the peak voltage detector 140. Since the output of the peak voltage circuit represents an inverted minimum of $e_{in}$, it is inverted by an amplifier 148 to provide the output voltage $e_{out}$ of the minimum voltage circuit.

The condition detector 98 of FIG. 11B responds to the signal $S\phi$ and the peak value of $S\phi$ ($E_{85}$) as provided by the peak voltage detector 85. It enables the gated integrators 94 through 96 to integrate and subsequently hold their output signals only when $S\phi$ is at or near a maximum value. If $S\phi$ subsequently exhibits a significantly higher value, the condition detector 98 resets the gated integrators so that they can begin new integrations near the new maximum value.

Figure 16:
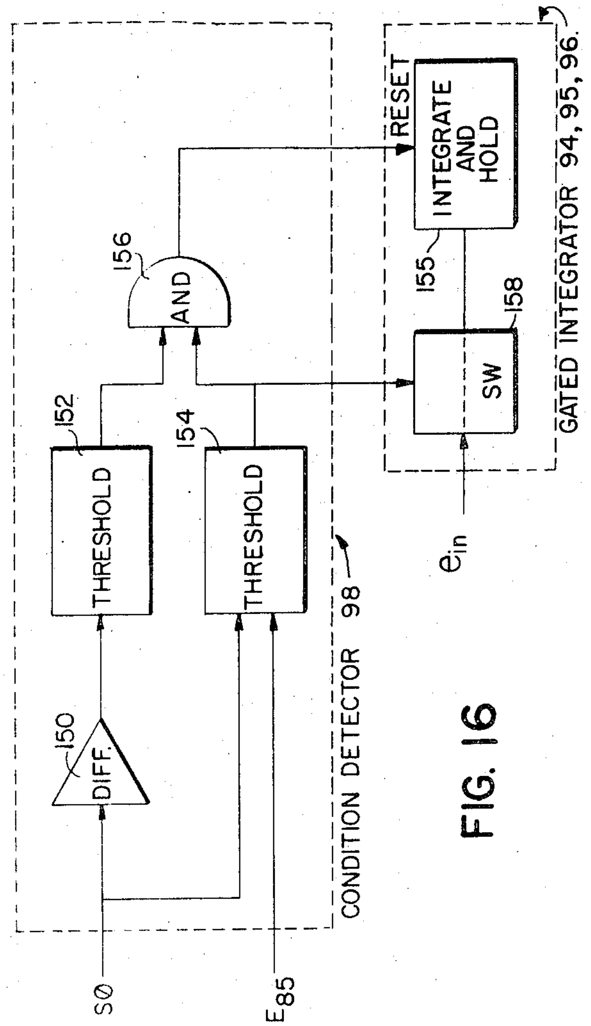
FIG. 16 is a schematic diagram of a gated integrator used in the system.

Referring to FIG. 16, the signal $S\phi$ is applied to a standard differentiating amplifier 150 whose output is coupled to a threshold circuit 152. The circuit 152 generates an output when the time derivative of the signal $S\phi$ exceeds a positive threshold.

The signal $S\phi$ and its peak value $E_{85}$ are applied to a second threshold circuit 154 that provides an output whenever $S\phi$ is equal to or greater than $E_{85}$. The outputs of the threshold circuits 152 and 154 are the inputs of an AND circuit 156 whose output resets the integrators 94 through 96.

Accordingly, an integrate and hold circuit 155 in integrators 94 through 96 is reset whenever $S\phi$ increases beyond its previous peak value during the scanning of a character. When $S\phi$ approaches a new peak value, its time derivative decreases below the threshold value and the output of the threshold circuit 152, which has minimal hysteresis, ceases. The output of AND circuit 156 also ceases, thereby terminating the reset condition of the integrators 94 through 96. On the other hand, the threshold circuit 154 has a significant degree of hysteresis. For example, its output may continue until $S\phi$ drops below 95 percent of its peak value. This output closes switches 158 in series with the inputs of the integrate and hold circuits 155 and the integrators thus integrate their input signals for a short interval immediately following the occurence of the peak of $S\phi$. That is, they integrate over a narrow section of the character at and in the vicinity of, the maximum solid height.

It should be noted that the threshold circuit 154 closes the switches 158 on succeeding maxima of Sϕ having the same value. However, the integrators 94 through 96 are not reset in such cases because the slope of Sϕ does not exceed its positive threshold value at the time Sϕ equals the peak voltage $E_{85}$. Accordingly, when a character has more than one maximum of Sϕ at the peak value of Sϕ e.g. the letter "H," the integrators provide sums of integrals in the vicinities of all such maxima.

Figure 17:
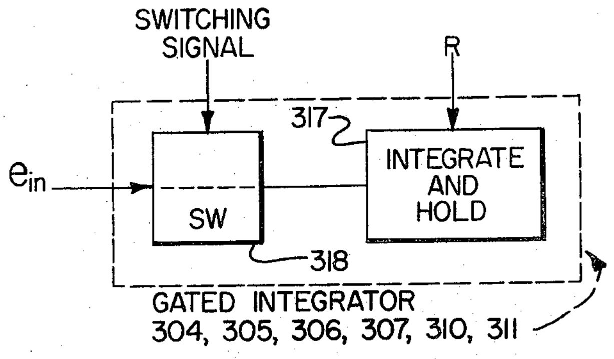
FIG. 17 is a schematic diagram of another gated integrator useful with circuitry of FIG. 11D.

FIG. 17 illustrates the circuitry used in each of the gated integrators 304 through 307, 310 and 311 of FIG. 11D. Respective input signals $e_{in}$ are permitted to drive an integrate and hold circuit 317 depending on the status of a switch 318. The signals which enable the switch for each gated integrator are shown in FIG. 11D.

Figure 18:
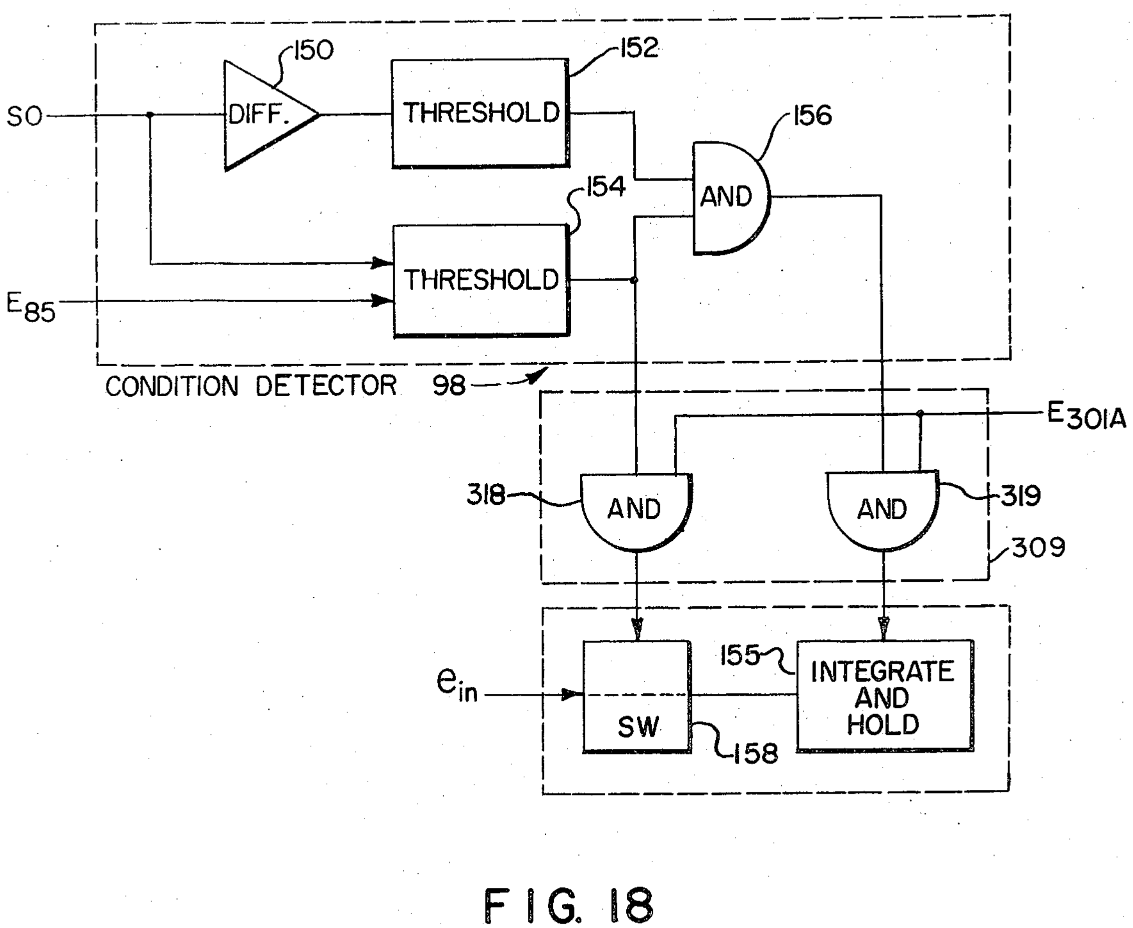
FIG. 18 is a schematic diagram of another gated integrator useful in the circuitry of FIG. 11D.

FIG. 18 illustrates the gated integrator 308 in FIG. 11D. This circuitry is the same as that shown in FIG. 16 except that AND gates 318 and 319 (gating circuit 309 in FIG. 11D) have been interposed between the condition detector 98 and respectively, the switch circuit 158 and the integrate and hold circuit. The E301A signal only enables both gates 318 and 319 while the system scans the left third section of a character.

There are several ways to determine the development aspect of a character, especially the slope and curve characteristics. The circuit in FIG. 11C converts the Sϕ, S1 and S2 signals into signals which identify the number, type and sequence of slopes and double slopes in the character being scanned.

The S1 and Sϕ signals, in combination, contain the necessary information for determining the number, type and sequence of single, sloped lines in a character. Referring to FIG. 3F, the letter "A" has a left-hand leg with an upward slope and a right-hand leg with a downward slope. The locus of the centroid for the letter "A" has similar slopes, as seen in FIG. 3J. The quotient of S1/Sϕ corresponds to the centroid and thus serves as a slope indicator. More specifically, dividing the S1 signal by the Sϕ signal normalizes S1 with respect to true thickness and therefore tends to eliminate signal variations which might otherwise mask related slope properties. For example, thickness variations of a sloped line as it changes from one font to another generally produce like changes in both the Sϕ and S1 signals, so the changes tend to cancel in the quotient.

As shown in FIG. 11C, the Sϕ and S1 signals are applied to an analog signal divider 160 to generate a signal representing the quotient S1/Sϕ. A clock 162 controls the rate at which a quotient analyzer 164 samples the quotient signal from the divider 160.

The analyzer 164 produces one of three outputs at output terminals **164*a*, 164*b*, and 164*c* during each sampling period. If the second of two successively sampled signals exceeds (is more positive than) the first signal by some threshold value, the analyzer 164 generates a pulse on terminal 164*a* to advance an up-down counter 166. Another up-down counter 168 is incremented by a pulse on terminal 164*b* when the second sampled signal is less (more negative) than the prior signal minus the threshold amount. As is apparent, the threshold levels define a deadband region. Whenever the difference between successive sampled pulses is in this region, the analyzer 164 generates a pulse at the terminal 164*c*. This pulse decrements both counters 166 and 168** simultaneously.

Changes in the quotient signal (S1/Sϕ) from sample to sample may indicate the presence of a sloped line or "feature transition area" in the character. The latter areas are places where lines are either added to or subtracted from the character image. For example, the quotient signal variation might be produced by scanning vertical lines. I avoid responses to these transitions by imposing a minimum duration constraint on the slope signal. Specifically, the counter 166 must reach a count in excess of some minimum value, e.g. 3, determined by a threshold circuit 170. When the count exceeds this value, the threshold circuit 170 emits a pulse that increments a counter 172 and sets a flip-flop 174. Therefore, the counter 172 records the presence of an upwardly sloped line. Similarly, a threshold circuit 176 responds to a predetermined value in the counter 168 to increment a counter 178. The counter 178 thereby records the number of downwardly sloped lines in a character. The threshold circuit 176 also resets the flip-flop 174 when it increments the counter 178.

Whenever a sample measured by the analyzer 164 exceeds the previous sample, the pulse from the terminal **164*a* resets the counter 168. If the sample is less than the preceding sample, the pulse at the terminal 164*b* resets the counter 166. This serves two purposes: it eliminates from the counters 166 and 168 the signals due solely to feature transitions; and it readies each counter for the detection of another slope after a previous one has been recorded in the counter 172 (or 178**).

After a character has been scanned, the counter 172 identifies the number of upwardly sloping lines in the character; the counter 178, the number of downwardly sloping lines. Furthermore, the flip-flop 174 provides sequence information. For example, if the flip-flop 174 is reset and the counter 172 and 178 both record one sloped line, the character has a line with an upward slope followed by a line with a downward slope.

While the normalized S1 signal provides information about single-sloped lines, it does not indicate double-sloped lines or curves. As previously indicated, the system treats curves which converge to the right (letter "D") or left (letter "C") in the same manner as double-sloped lines which converge to the right (symbol ">") or left (letter "K"). Since the system treats both curves and straight-line double slopes in the same fashion, I use the term double slope to describe both features. Consider the letter "O," for example. As the system takes slices progressively from the left-hand edge of the character, the centroid position remains substantially constant, so the quotient S1/Sϕ is constant. However, the quotient S2/Sϕ for the letter "O" does vary (FIG. 2K) because the second moment (S2) is a function of the square of the height above the bottom of the character. This division by Sϕ is a normalization operation that accomplishes the same purposes as the division of S1 and Sϕ.

The circuit I use to determine the number, type and sequence of double slopes is analogous to the circuit for determining the number, type and sequence of single slopes. A divider circuit 180 generates the quotient signal S2/Sϕ. A quotient analyzer 182 controlled by the clock 162 samples the output from the analyzer 180 and increments an up-down counter 184 (for increases in successive samples) or an up-down counter 186 (for decreases in successive samples). The analyzer 180 also defines a dead-band region. Differences between successive samples which fall in this region cause the analyzer 180 to decrement both counters 184 and 186.

Threshold circuits 188 and 190 place a minimum constraint on the number of normalized S2 signal increases or decreases before recording the presence of a double slope converging to the left in a counter 192 or converging to the right in a counter 194. Whenever the threshold circuits 188 and 190 increment one of the counters 192 and 194, they set or reset a flip-flop circuit 196.

After a character has been scanned, the counters 192 and 194 identify the number of double slopes which converge to the right or left, respectively. The flip-flop circuit 196 and the counters also indicate the last part of the sequence in which the double slopes appear.

The processing section 63 also includes an override unit 198 that prevents the double slope detector from responding to single slopes. The override unit 198 responds to an output at the terminal 164*a* or 164*b* to inhibit any pulses from incrementing the counter 184 or the counter 186, respectively, e.g. by clamping the counter inputs to a zero value. Alternatively, one might permit the double slope detector to count single slopes as well as double slopes and then obtain double-slope counts by subtracting the contents of the counters 172 and 178 from the contents of the counters 192 and 194.

The occurrence of maxima and minima in a single moment signal or in pairs of moment signals is also recorded as is the number of vertical or near vertical lines. A counter 200 (FIG. 11B) registers the number of maximums in the primary signal S$\phi$ by counting pulses generated with the minimum voltage detector 90 whenever the signal S$\phi$ passes through a maximum. Referring to FIG. 15, these pulses come from the threshold circuit 144, which has a transition when the slope of the signal S$\phi$ goes through zero in the negative direction corresponding to a peak of S$\phi$. The counter 200 selectively responds to the negative-going transitions of the output of the circuit 144 at these times.

An output signal $E_{202}$ from a flip-flop 202 identifies characters which either have no minimum section ($h_{s\ min}$) or in which the peak value of S$\phi$ ($h_{s\ max}$) is the last maximum of S$\phi$, e.g. "I" "*a*" and "*d*," but not "H," "N," "*h*, " "*b*." The flip-flop 202 is set by the occurrence of each new S$\phi$ maximum that is higher than a previous maximum, as indicated by the output of the AND circuit 156 (FIG. 16) in the condition detector 98. A reset signal for this flip-flop is generated by a positive-going transition of the threshold circuit 144 (FIG. 15) in the minimum voltage circuit 90 when the time derivative of the primary signal S$\phi$ goes through zero from a negative to a positive value, indicating a minimum. Consequently, if the flip-flop 202 is set after a character is scanned, the character either lacks a minimum section or the last maximum of solid height is at the peak value thereof.

The quantifier 64 (FIG. 11C) has a series of output terminals 64*a* to which it applies a set of voltages indicating the values of the first twelve parameters listed in FIG. 12. Desirably, the scale values of the various parameters are presented in binary form. The voltage at each terminal 64*a* thus represents one bit of a number corresponding to the value of one of the parameters. The various units in the processing section 63 provide the decoder 65 with further binary-coded information relating to the development and sequential aspects of the character. The resulting series of bits constitute a "word" that identifies the character. In effect, the decoder "compares" the word with words identifying prototype characters. It may do this in a known manner by means of a combination of coincidence circuits. The output of the decoder will then be a signal appearing at a single one of a plurality of terminals 65*a* representing the various characters that the system can recognize.

Alternatively word comparison may be done by a digital computer which may also be programmed to perform the functions of the arithmetic unit 100 and quantifier 64.

The enabling section 66 of FIG. 11A generates start, stop and reset commands altering the states of various switches. As soon as a character enters the field of view of the sensor unit 26 (FIG. 9), the resulting appearance of the signal S$\phi$ is detected by a threshold circuit 204. The resulting start output of the circuit 204 closes the switch 75 to initiate operation of the timing generator 74 as noted above. The switch 75 also applies a control voltage to grounding switches 206 on the S$\phi$–S4 lines, thereby opening the switches 206 and permitting the signals to reach the processing sections 62, 63 and 300 (FIGS. 11B, 11C and 11D).

When scanning of the character has been completed the resulting disappearance of the signal S$\phi$ provides a corresponding drop in the output of threshold circuit 204. This stop signal turns off the switch 75, thereby stopping the timing generator 74, as described above. Also, the grounding switches 206 close, thereby cutting off the S$\phi$–S4 inputs to the sections 62, 63 and 300. Preferably, the various integrate-and-hold circuits (FIGS. 13 through 18) are provided with similar switches (not shown) at their input terminals, with the output of the threshold circuit 204 controlling those switches also.

A one-shot multivibrator 208 responds to the stop signal from the circuit 204 by generating a delayed readout pulse indicating that a character identification is present in the system. A second-shot multivibrator 210, triggered by the output of the multivibrator 208, initiates operation of a reset voltage generator 212, the reset output of which resets the various integrators, counters and flip-flops in the system.

Compensation for variations in contrast between characters and the background on which they are imprinted is accomplished by means of the linear photo array 57 in FIG. 9. The array 57 is composed of a single row of small photocells wherein each photocell views a small, nonoverlapping, adjacent portion of the slit 50. The number of photocells is sufficient to permit the array to view the entire length of slit 50; however field of view of each cell is sufficiently small so that at least one photocell senses background and at least one photocell senses a line of a character. For purposes of this discussion, assume a photocell emits a maximum or near maximum output voltage when it senses a character and a minimum or near minimum voltage when it senses background.

Figure 19:
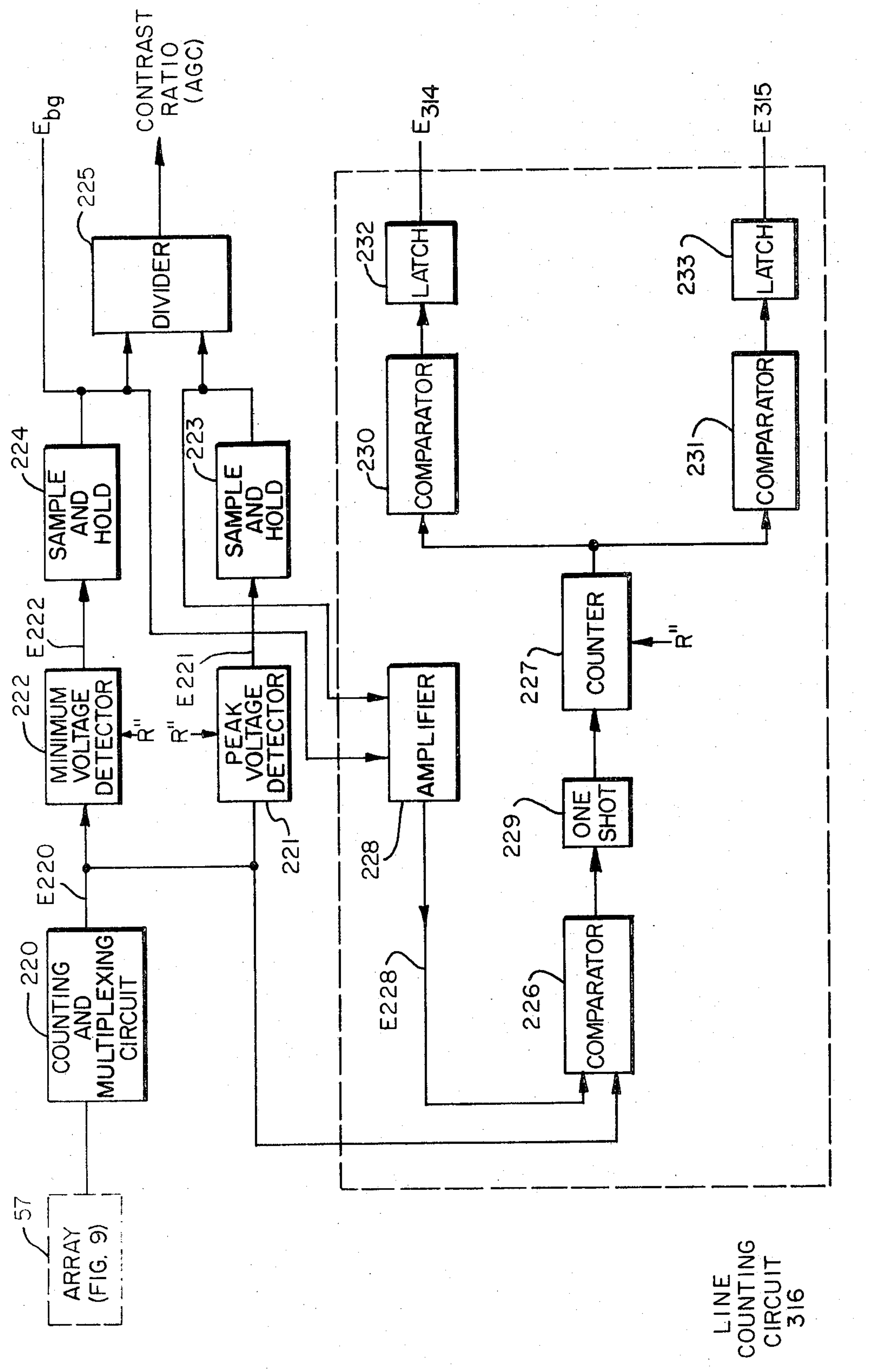
FIG. 19 is a schematic diagram of a contrast compensation circuit useful in the circuitry of FIG. 11A.

Compensation for contrast variations is accomplished by sampling the output of the array, detecting maximum and minimum output levels, and adjusting the background voltage $E_{bg}$ and the AGC signal used by amplifiers 67 in FIG. 11A. Referring to FIG. 19, the first step is accomplished by a counting and multiplexing circuit 220 which successively samples the output of each photocell in the array 57 and generates a representative voltage E220. Thus the output appears as a pulse train. Prior to the beginning of a sampling cycle, a peak voltage detector 221 and a minimum voltage detector detector 222 are reset. After the array 57 is sampled, the peak and minimum voltages E221 and E222 are stored in sample and hold circuits 223 and 224, respectively. As apparent, the stored minimum voltage in the circuit 224 represents the background level and it is used as the Ebg signal. A divider 224 ratios the signals from the circuits 223 and 224 and the ratio indicates the contrast. The signal output is used as the AGC signal in FIG. 11A. This AGC signal decreases amplifier gain as the contrast ratio increases.

Certain special case component characteristics and comparison parameters require a line count. Still referring to FIG. 19, a comparator 226 receives the E220 signal. Simultaneously, the minimum and maximum voltages of the prior array sampling E223 and E224 are added and divided by two in amplifier 228 to produce a mean value signal E228, which is also applied to comparator 226. Before each sampling operation, a counter 227 is reset to zero. As the circuit 220 samples the array 57, the E220 signal is compared to the E228 signal in comparator 226. When E220 exceeds the value of E228, a character segment is indicated and the comparator 226 triggers a one-shot multivibrator 229 to increment the counter 227. At the completion of sampling cycle, the counter 227 exhibits the number of character segments (lines) in the section appearing at the array 57. At this time, the output of the counter 227 is compared in comparators 230 and 231, which are preset to two and, two or more, respectively. The output of these comparators are then strobed into latches 232 and 233. Consequently, latch 232 generates an E314 voltage whenever there are exactly two lines or segments present in the character and stores that information until the end of the next sampling cycle. Similarly, latch 233 generates an E315 signal which indicates the presence of two or more lines and saves this signal until the next sampling cycle.

These E314 and E315 signals are then applied to AND gates 312 and 313 in FIG. 11D. Although these signals represent the number of lines in the portion immediately before the one being scanned, any error has little effect.

Where desired, the system can be made to indicate the end of a character and the presence of a succeeding space by detecting a predetermined time interval in which one or more of the signals $S\phi$, S1 and S2 are absent.

The system does not actually make its vertical measurements with reference to the bottom axis B—B of each character (FIGS. 3N and 3S) but rather from the bottom of the scanning slit 30 (FIG. 2A). However, as mentioned previously, the normalization inherent in the fundamental characteristics minimizes any effects. For example, the characteristic $h_c/h_c$ max is a comparison of the centroid height of the entire character to the centroid height of the maximum section. Within reasonable limits, it makes little difference where these heights are measured from, as long as they are both measured from the same axis. A more accurate measurement of the disparity between $h_c$ and $h_c$ max might be obtained by subtracting one from the other. However, the ratio will generally suffice.

Alternatively one might increase accuracy by means of a servo-controlled positioning system that vertically positions the document 32 (FIG. 8) or the senosr unit 26 so as to standardize the position of the characters 28–30 relative to the bottom of the slit 50. Again, however, this will ordinarily not be necessary.

It will be apparent that we may make numerous modifications in the system without departing from the scope of the invention. For example, one might use a cathode ray tube to sweep a small light spot back and forth vertically as the characters move past, thereby, in effect, illuminating each character with a raster of lines. The light transmitted (or reflected) from the document can then be focused on a single photocell and the output of the photocell can be processed electronically to provide the weighting functions of the filters **58*b*–60b (FIG. 10**). In this connection, I note that the term "filter" as used herein applies broadly to any arrangement that accomplishes the weighting functions necessary for measurements of various moments.

In a reflective optical system, light from a source might reflect from the document to a sensor on the same side of the document as the light source. Further the sensor might certain a vertical column of photocell devices which are turned either "on" or "off" in a digital sense. A series of counters would then receive weighted counts indicating the various moments of a portion or slice being sensed as a scanning device sampled the outputs of the photocells in succession. Thus, in a given sampling operation, the total number of photocells responding to character portions indicates the zero order moment ($S\phi$). If each photocell causes a count to be added in a second or third counter which is proportional to its position or the square of its position, the counters contain the S1 and S2 signals for the portion or slice at the end of the sampling operation. The moments are about a horizontal axis. The definition of the first and second order moments (i.e., the S3 and S4 signals) about a vertical axis are similarly obtained using the SO signal or count to load counters corresponding to the S3 and S4 signals. This is an example of a substantially digital system. It will be apparent thay hybrid analog and digital systems may also be used.

Also, the system might be arranged to scan across each character vertically instead of horizontally, or in both directions, although in the embodiment described above, horizontal scanning is more easily and efficiently accomplished.

One might provide a shutter arrangement to vary the height of the scanning slit 50. A servo system could be used to adjust the shutter according to character height by sensing signal change as the shutters are moved. This would serve two useful purposes, namely, (1) the reduction of background noise by limiting the field of view to the characters and (2) the production of a signal indicating character height, and therefore be useful in normalizing. The character height could be sensed for each line during the carriage return interval by indexing to a succeeding line at the end of the scan of the preceding line and thereby returning over a line before it is scanned for character recognition.

Certain measurements might be made more accurately by using a "look-adhead" detector. The look-adhead detector would ascertain the maximum solid height and the maximum width of each character. If this information is known before the detectors 58–60 (FIG. 9) scan the character, the detection of minimums, slope and curve characteristics, non-maximum sections and thirds or halves of the character can be simplified or made more accurate.

For example, the minimum voltage detectors 90, 91 and 92 (FIG. 11B) use circuitry to distinguish terminal transition areas at the beginning and end of each character. Much of this complexity can be reduced by using a look-ahead detector which records the character width. The terminal transition areas can be defined by stored signals from the look-ahead detector to indicate when the slit 50 is scanning the beginning or end portion of the character. The intermediate range of signal values represents the range in which true minimums can occur. In addition to simplifying the measurement circuits, the use of the character width signal to divide the character into thirds or halves seems to offer greater recognition consistency from font to font.

Prior knowledge of character width also improves slope detection. The clock 162 and various threshold circuits in FIG. 11C impose a minimum duration constraint on slope or curve recognition. This is a fixed-time period and bears no relation to the character width. With some characters, a slope might go undetected when the constraint time exceeds the sloped or curved line scan time.

Therefore, the circuit in FIG. 11C can be modified to alter the threshold or clock frequency in response to character width.

I obtain a measurement of the non-maximum solid height in the circuit of FIG. 11B by effectively subtracting the maximum solid height from the total solid height. If, on the other hand, the look-adhead detector has already sensed the areas of maximum solid height of a character, integrations can be limited to non-maximum areas so no subtraction steps are necessary. Specifically, the maximum solid height signal controls the threshold level for the circuits 152 and 154 (FIG. 16) so the gated integrators 94, 95 and 96 only integrate in non-maximum sections. The circuits 152 and 154 disable the integrators for values of $S\phi$ which lie above the threshold level and represent maximum conditions.

In one embodiment, the reader (FIG. 8) has a preview slit which scans immediately before the slit 50. Circuits analogous to the detector circuit 58, amplifier 64*a*, inverter 68*a*, switch 69*a*, switch 206, and peak voltage detector 85 (FIG. 11B) respond to the light passing through the preview slit and generate the maximum solid height signal. Circuits analogous to the threshold circuit 204, the switch 75 and the timing generator 74 produce the character width signal. Then the character width and maximum solid height signals are sotred in capacitors or other analog or digital storage units for use when the slit 50 scans the character.

In another embodiment, the reader may cause the slit 50 to scan each line twice. During a first scan, the circuits in FIG. 11 generate a sequence of maimum solid height and character width signals for each character. Each pair of signals are then stored for retrieval in sequence when the detectors scan a corresponding character for recognition during the pass of the slit.

Also the maximum value of the height signal ($S\phi$) and the minimum value or the width of a maximum might be used as an indication of the ratio of character height to line thickness. In some cases, this information will eliminate some fonts from consideration and thereby simplify the matching of measured parameters to the stored prototype parameters.

Nor is the invention limited to the particular fundamental parameters disclosed above. For example, the overall height of the character might be sensed and used in normalizing instead of, or in addition to, the maximum solid height ($h_s$ max). The quantities $h_c$ max, $h_c$min and $h_g$min might be defined as coinciding with the peak and least values of the solid height $h_s$max, respectively, and measured accordingly. Different and more complex moments might be used. For example, one might employ moments representing polynominal, trigonometric and exponential functions or combinations of such functions. Moreover, various characteristics measured with respect to horizontal axes might be taken with respect to vertical axes simultaneously.

Furthermore, a system which senses and compares all the foregoing fundamental parameters can respond to a wide variety of characters and fonts. It is apparent that there are applications where the number of characters on fonts are limited. For example, a check-reading apparatus might only have to recognize numerals in one font. In these applications, the measurements of various comparison parameters can be omitted without a loss in recognition accuracy. Therefore, it is the object of the appended claims to cover all such variations and modifications as come within the true spirit and scope of this invention.

What I claim as new and desire to secure by Letters Patent of the United States is:

1. A method of identifying an unknown pattern comprising the steps of:

A. measuring a plurality of moments about at least one predetermined axis in each of successive portions of the pattern, at least two of the moments being different moments with respect to the same axis, B. generating a moment signal corresponding to the value of each of the measurements, C. selecting certain of the moment signals indicative of predetermined characteristics of the pattern in sections thereof less than the entire pattern, D. generating a plurality of comparison parameter signals including comparison parameter signals for the sections, at least one of the comparison parameter signals for a section being generated by taking a ratio of said moment signals, at least one moment signal for that ratio being a preselected moment signal for that section, and E. comparing the values of the comparison parameter signals with corresponding values of reference patterns to identify the unknown pattern.

2. A method as recited in claim 1 wherein said selecting step includes the selection of moment signals in sections of the pattern which produce maximum and minimum values of a moment signal and said comparison parameter signal generating step additionally generates signals corresponding to the value of a moment signal for those sections.

3. A method as recited in claim 1 wherein said measuring and moment signal generating steps develop signals representing moments of a pattern about a first axis, said moment signal generating step additionally including generating signals representing moments of the pattern about a second axis perpendicular to the first axis.

4. A method as recited in claim 1 wherein said moment signal generating step includes:

i. generating a moment signal proportional to the area of the pattern in each portion, and
ii. generating a moment signal proportional to the aggregate distance of the pattern area in each portion from an axis perpendicular to the direction of succession of the portions.

5. A method as recited in claim 4 wherein said moment signal generating step additionally includes generating a moment signal disproportionate to the aggregate distance.

6. A method as recited in claim 1 wherein said selecting step includes the selection of moment signals in sections of the pattern which produce maximum and minimum values of a moment signal and said comparison parameter signal generating step additionally generates signals corresponding to the integrals over sections of moment signals in the sections.

7. A method as recited in claim 6 wherein said selecting step includes the selection of moment signals in other sections of the pattern which produce moment signal values which are other than maximum and minimum values and said comparison parameter signal generating step additionally generates comparion parameter signals corresponding to integrals over sections of moment signals in the other sections.

8. A method as recited in claim 1 wherein at least one comparison parameter signal represents a comparison of moment signals representing moments of different sections of the pattern.

9. A method as recited in claim 6 wherein in one section the selected moment signal is a maximum and in another section a selected moment signal is a minimum.

10. A method as recited in claim 1 wherein said moment signal generating step includes:

i. generating a moment signal proportional to the area of the pattern in each portion, and
ii. generating a moment signal proportional to the aggregate distance of the pattern area in each portion from the predetermined axis, the predetermined axis being parallel to the direction of succession of the portions.

11. A method as recited in claim 10 wherein said moment signal generating step additionally includes generating a moment signal disproportionate to aggregate distance from the predetermined axis.

12. A system for identifying a pattern, said system comprising:

A. means for measuring a plurality of moments about at least one predetermined axis in each of successive portions of the pattern, at least two of the moments being different moments with respect to the same axis,
B. means connected to said measuring means for generating a moment signal corresponding to the value of each measured moment,
C. means for selecting certain of the moment signals indicative of predetermined characteristics of the pattern in sections thereof less than the entire pattern,
D. means connected to said moment signal generating means and said selecting means for generating a plurality of comparison parameter signals including comparison parameter signals for the sections, at least one of the comparison parameter signals for a section being generated by taking a ratio of the moment signals, at least one moment signal for that ratio being a preselected signal for that section, and
E. means connected to said comparison parameter signal generating means for comparing the values of the comparison parameters with corresponding values of reference patterns to identify the unknown pattern.

13. The system defined in claim 12 in which said comparison parameter signal generating means includes means for generating a signal representing the centroid position of a section of the pattern in which the zero order moment is other than a maximum, the centroid position being obtained from the zero and first order moment signals.

14. The system defined in claim 12 in which the moment signals correspond to the zero, first and second order moments with respect to the axis, said measuring means additionally including i. means for developing time signals representing the elapsed time from commencement of the measuring of said moments and the square of the elapsed time, and
ii. means for multiplying said zero moment by said time signals to provide further moment signals corresponding to the first and second order moments of said portions about a second axis tranverse to said first axis.

15. The system defined in claim 12

A. said selecting means including means for detecting the occurrence of maxima of at least one of said moment signals, and
B. said comparison parameter signal generating means including means for counting the number of maxima of each moment for which the maxima are detected, the output of said counting means constituting a comparison parameter signal.

16. The system defined in claim 12 in which said selecting means includes means for selecting moment signals in a section corresponding to the occurrence of the peak value of one of said moment signals and said comparison parameter generating means includes means for integrating over sections a plurality of the moment signals in the sections.

17. The system defined in claim 16 in which said selecting means includes means for selecing moment signals in other sections in which a selected moment signal is at other than the peak value said compison parameter signal generating means includes means for integrating over sections a plurality of the moment signals in the sections corresponding to the other sections.

18. The system defined in claim 12 in which the moment signals represent the zero, first and second order moments, said comparison parameter signal generating means additionally including A. means for obtaining a first ratio of the first moment signal to the zero moment signal, and
B. means responding to changes in the value of the first ratio to provide a signal indicating the presence of a single slope signal in said pattern.

19. The system defined in claim 18 wherein said comparison parameter signal generating means further includes A. means for obtaining a second ratio of the second moment signal to the zero moment signal, and B. means responding to changes in the value of the second ratio to provide a double slope signal responsive to a double slope in said pattenr.

20. A system as recited in claim 12 wherein said moment signal generating means includes:

i. means for generating a moment signal proportional to the area of the pattern in each portion, and ii. means for generating a moment signal proportional to the aggregate distance of the pattern area in each portion from the predetermined axis, the predetermined axis being parallel to the direction of succession of the portions.

21. A system as recited in claim 18 wherein said moment signal generating means additionally includes means for generating a moment signal disproportionate to the aggregate distance.

22. A system as recited in claim 12 wherein said moment signal generating means includes i. means for generating a moment signal proportional to the area of the pattern in each portion, and ii. means for generating a moment signal proportional to the aggregate distance of the patern area in each portion from an axis perpendicular to the direction of succession of the portions.

23. A system as recited in claim 22 wherein said moment signal generating means additionally includes means for generating a moment signal disproportionate to the aggregate distance.

* * * * *